United States Patent
Junk et al.

(10) Patent No.: US 11,327,450 B2
(45) Date of Patent: May 10, 2022

(54) METHODS AND APPARATUS FOR MULTIMODE REST COMMUNICATIONS IN PROCESS CONTROL SYSTEMS

(71) Applicant: Fisher Controls International LLC, Marshalltown, IA (US)

(72) Inventors: Kenneth W. Junk, Marshalltown, IA (US); Annette Lynn Latwesen, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 16/388,449

(22) Filed: Apr. 18, 2019

(65) Prior Publication Data

US 2019/0243321 A1     Aug. 8, 2019

Related U.S. Application Data

(63) Continuation of application No. 14/684,016, filed on Apr. 10, 2015, now Pat. No. 10,303,134.

(51) Int. Cl.
*G05B 15/02* (2006.01)
*H04W 4/80* (2018.01)
(Continued)

(52) U.S. Cl.
CPC ............. *G05B 15/02* (2013.01); *G05B 19/00* (2013.01); *G06K 19/0709* (2013.01);
(Continued)

(58) Field of Classification Search
CPC ............... G05B 15/02; G05B 19/00; G05B 2219/25428; G06K 19/0709; H04W 4/008
(Continued)

(56) References Cited

U.S. PATENT DOCUMENTS 5,420,578 A    5/1995   O'Brien et al.
5,629,981 A    5/1997   Nerlikar
(Continued)

FOREIGN PATENT DOCUMENTS

DE    102009006662    7/2010
DE    102011081517    2/2013
(Continued)

OTHER PUBLICATIONS

United States Patent and Trademark Office, "Notice of Allowance," issued in connection with U.S. Appl. No. 15/876,371, dated Feb. 4, 2019, 10 pages.
(Continued)

*Primary Examiner* — Chad G Erdman
(74) *Attorney, Agent, or Firm* — Hanley, Flight & Zimmerman, LLC

(57) ABSTRACT

An example apparatus includes a first sensor tag to retrieve operational data, via a modem and a data bus, from a process control field device, wherein the first sensor tag includes a memory to store the operational data; a first antenna arranged to communicate with the first sensor tag when the first sensor tag receives operational data, the first antenna to communicate with the first sensor tag via a first frequency band; and a first identification device to retrieve the operational data from the first sensor tag, via the first antenna and the first frequency band, while the process control field device is unpowered.

27 Claims, 8 Drawing Sheets

(51) Int. Cl.
*G05B 19/00* (2006.01)
*G06K 19/07* (2006.01)
*G05B 19/042* (2006.01)

(52) U.S. Cl.
CPC ........... *H04W 4/80* (2018.02); *G05B 19/0423* (2013.01); *G05B 2219/25187* (2013.01); *G05B 2219/25204* (2013.01); *G05B 2219/25428* (2013.01)

(58) Field of Classification Search
USPC .......................................................... 700/19
See application file for complete search history.

(56) References Cited

U.S. PATENT DOCUMENTS

| | | | |
|---|---|---|---|
| 7,058,542 | B2 | 6/2006 | Hauhia et al. |
| 7,274,910 | B2 | 9/2007 | Gilbert et al. |
| 7,356,393 | B1 | 4/2008 | Schlatre et al. |
| 7,640,007 | B2 | 12/2009 | Chen et al. |
| 7,796,040 | B2 | 9/2010 | Mezhinsky et al. |
| 7,828,008 | B1 | 11/2010 | Beckman et al. |
| 7,880,670 | B2 | 2/2011 | Villarroel et al. |
| 8,081,079 | B1 | 12/2011 | Camarota |
| 8,212,655 | B2 | 7/2012 | Nelson et al. |
| 8,384,519 | B2 | 2/2013 | Kuhl et al. |
| 8,860,611 | B1 | 10/2014 | Anderson et al. |
| 9,392,103 | B2 | 7/2016 | Maguire et al. |
| 9,881,189 | B2 | 1/2018 | Debates et al. |
| 9,881,250 | B2 | 1/2018 | Lovell et al. |
| 9,893,770 | B2 | 2/2018 | Junk et al. |
| 10,003,863 | B2 * | 6/2018 | Louzir .................. H04Q 9/00 |
| 10,325,197 | B2 | 6/2019 | Lovell et al. |
| 11,003,976 | B2 | 5/2021 | Lovell et al. |
| 2001/0010032 | A1 | 7/2001 | Ehlers et al. |
| 2002/0067267 | A1 | 6/2002 | Kirkham |
| 2003/0155415 | A1 | 8/2003 | Markham et al. |
| 2004/0195319 | A1 | 10/2004 | Forster |
| 2005/0162256 | A1 | 7/2005 | Kinoshita |
| 2005/0249252 | A1 | 11/2005 | Sanchez |
| 2005/0280511 | A1 | 12/2005 | Yokoyama et al. |
| 2006/0022800 | A1 | 2/2006 | Krishna et al. |
| 2006/0026316 | A1 | 2/2006 | Milenkovic et al. |
| 2006/0158533 | A1 | 7/2006 | Brahmbhatt et al. |
| 2006/0200256 | A1 | 9/2006 | Mason et al. |
| 2006/0229113 | A1 | 10/2006 | Rowse |
| 2006/0244568 | A1 | 11/2006 | Tong et al. |
| 2007/0021140 | A1 | 1/2007 | Keyes, IV et al. |
| 2007/0114280 | A1 | 5/2007 | Coop et al. |
| 2007/0210923 | A1 * | 9/2007 | Butler ................ G06K 19/0723 340/572.8 |
| 2007/0241908 | A1 | 10/2007 | Coop |
| 2007/0247284 | A1 | 10/2007 | Martin et al. |
| 2007/0290815 | A1 | 12/2007 | Delis |
| 2008/0004798 | A1 | 1/2008 | Troxler et al. |
| 2008/0048837 | A1 | 2/2008 | Montgomery et al. |
| 2008/0061979 | A1 | 3/2008 | Hause et al. |
| 2008/0138701 | A1 | 6/2008 | Kuboki et al. |
| 2008/0174436 | A1 | 7/2008 | Landt et al. |
| 2008/0238679 | A1 | 10/2008 | Rofougaran et al. |
| 2008/0273486 | A1 | 11/2008 | Pratt et al. |
| 2008/0277463 | A1 | 11/2008 | Braun |
| 2009/0015216 | A1 | 1/2009 | Seberger et al. |
| 2009/0102656 | A1 | 4/2009 | Goodman et al. |
| 2009/0292572 | A1 | 11/2009 | Alden et al. |
| 2009/0303898 | A1 | 12/2009 | Isenmann et al. |
| 2010/0090806 | A1 * | 4/2010 | Schork .................. G06Q 50/06 340/10.4 |
| 2010/0136911 | A1 | 6/2010 | Sekita et al. |
| 2010/0156613 | A1 | 6/2010 | Hirata et al. |
| 2010/0231407 | A1 | 9/2010 | Carr |
| 2010/0302008 | A1 | 12/2010 | Engelstad et al. |
| 2011/0111695 | A1 | 5/2011 | Shameli et al. |
| 2011/0131455 | A1 | 6/2011 | Law et al. |
| 2011/0206160 | A1 * | 8/2011 | Sung .................... H04B 17/21 375/316 |
| 2011/0249394 | A1 | 10/2011 | Nielsen et al. |
| 2011/0279239 | A1 | 11/2011 | Gravelle et al. |
| 2012/0040698 | A1 | 2/2012 | Ferguson et al. |
| 2012/0068827 | A1 | 3/2012 | Yi et al. |
| 2012/0135681 | A1 | 5/2012 | Adams et al. |
| 2012/0252361 | A1 | 10/2012 | Stromberger et al. |
| 2013/0035802 | A1 | 2/2013 | Khaitan et al. |
| 2013/0049935 | A1 | 2/2013 | Miller |
| 2013/0057390 | A1 | 3/2013 | Watt et al. |
| 2013/0132282 | A1 | 5/2013 | Shakkarwar |
| 2013/0134226 | A1 | 5/2013 | Chen |
| 2013/0134774 | A1 | 5/2013 | Kennedy |
| 2013/0141217 | A1 | 6/2013 | Goren et al. |
| 2013/0141888 | A1 | 6/2013 | Wittmer et al. |
| 2013/0159200 | A1 | 6/2013 | Paul et al. |
| 2013/0176115 | A1 | 7/2013 | Puleston et al. |
| 2013/0190897 | A1 | 7/2013 | Junk et al. |
| 2013/0201003 | A1 | 8/2013 | Sabesan et al. |
| 2013/0212005 | A1 | 8/2013 | Marincola et al. |
| 2013/0249301 | A1 | 9/2013 | Smoot et al. |
| 2013/0270342 | A1 * | 10/2013 | Koyama ............ G06K 7/10178 235/439 |
| 2013/0288595 | A1 | 10/2013 | Lee et al. |
| 2014/0062661 | A1 | 3/2014 | Gallo et al. |
| 2014/0104044 | A1 * | 4/2014 | Morimoto .......... G06K 7/10009 340/10.51 |
| 2014/0107993 | A1 | 4/2014 | Cheng |
| 2014/0183261 | A1 | 7/2014 | Ung et al. |
| 2014/0203915 | A1 | 7/2014 | Puleston et al. |
| 2014/0313050 | A1 * | 10/2014 | Hamilton ................. G01D 4/00 340/870.02 |
| 2014/0361087 | A1 | 12/2014 | Lovell |
| 2014/0364963 | A1 | 12/2014 | Lovell et al. |
| 2015/0088617 | A1 * | 3/2015 | Geist ..................... G06Q 20/26 705/13 |
| 2015/0113180 | A1 * | 4/2015 | Baret .................. G05B 19/042 710/36 |
| 2015/0123815 | A1 | 5/2015 | Mejegard et al. |
| 2015/0171930 | A1 | 6/2015 | Joehren |
| 2015/0254677 | A1 | 9/2015 | Huxham et al. |
| 2016/0299478 | A1 | 10/2016 | Junk et al. |
| 2017/0005703 | A1 | 1/2017 | Junk et al. |
| 2017/0270323 | A1 | 9/2017 | Butler et al. |

FOREIGN PATENT DOCUMENTS

| | | |
|---|---|---|
| DE | 102012214693 | 2/2013 |
| DE | 102011084789 | 4/2013 |
| EP | 1832943 | 9/2007 |
| WO | 2010094301 | 8/2010 |
| WO | 2013112421 | 8/2013 |
| WO | 2014197779 | 12/2014 |
| WO | 2014197785 | 12/2014 |

OTHER PUBLICATIONS

International Bureau, "International Preliminary Report on Patentability," issued in connection with PCT Application No. PCT/US2014/041265, dated Dec. 17, 2015, 10 pages.

United States Patent and Trademark Office, "Notice of Allowance and Fee(s) Due," issued in connection with U.S. Appl. No. 15/183,439, dated Dec. 18, 2017, 7 pages.

United States Patent and Trademark Office, "Non-Final Office Action," issued in connection with U.S. Appl. No. 15/183,439, dated Jan. 17, 2017, 10 pages.

United States Patent and Trademark Office, "Non-Final Office Action," issued in connection with U.S. Appl. No. 14/297,179, dated Jun. 30, 2016, 28 pages.

Patent Cooperation Treaty, "International Preliminary Report on Patentability," issued in connection with PCT Patent Application No. PCT/US2014/041279, dated Dec. 8, 2015, 7 pages.

Patent Cooperation Treaty, "Written Opinion," issued in connection with PCT Patent Application No. PCT/US2014/041279, dated Sep. 18, 2014, 6 pages.

(56) References Cited

OTHER PUBLICATIONS

Patent Cooperation Treaty, "International Search Report," issued in connection with PCT Patent Application No. PCT/US2014/041279, dated Sep. 18, 2014, 5 pages.
United States Patent and Trademark Office, "Non Final Office Action," issued in connection with U.S. Appl. No. 15/876,371, dated Jul. 26, 2018, 33 pages.
AMS AG, "RFID with Senses SL13A—ISO 15693 Sensor Tag IC," Product Brochure, Feb. 2013, 2 pages.
AMS AG, "RFID with Senses SL900A—EPC Gen2 Sensor Tag IC," Product Brochure, Feb. 2013, 2 pages.
Claire Swedberg, "BG Uses RFID Sensors to Track Pipe Corrosion," Jan. 31, 2011, [http://www.rfidjournal.com/articles/view?8181], retrieved on May 12, 2014, 2 pages.
D. De Donno et al., "Enabling Self-Powered Autonomous Wireless Sensors with New-Generations I2C-RFID Chips," 2013 IEEE MTT-S International Microwave Symposium Digest (MMT), Seattle, WA, Jun. 2013, 4 pages.
IDS Microchip AG, "SL900A Single-Chip EPC Data Logger with Sensor," Product Flyer, Mar. 2010, 2 pages.
Impinj, "Introducing Monza X Chips," [www.impinj.com], 2012, 2 pages.
Intelleflex Corporation, "Intelleflex SMT-8100 Special Purpose RFID Tag for Metals & Liquids," 2012, 2 pages.
Intelleflex Corporation, "Intelleflex TMT-8500 Temperature Monitoring Tag," Data Sheet, 2010, [www.intelleflex.com], 2 pages.
International Searching Authority, "International Search Report", issued in connection with PCT Application No. PCT/US2014/041265, dated Sep. 17, 2014, 3 pages.
International Searching Authority, "Written Opinion", issued in connection with PCT Application No. PCT/US2014/041265, dated Sep. 17, 2014, 8 pages.
Tego, "Tego Chip Dual Memory (DM)," Brochure, [www.tegoinc.com], 2013, 2 pages.
William Frick & Company, "Solar Powered RFID Tag (Off-Metal)," [www.fricknet.com], Technical Data Sheet, 4 pages.
Emerson, "Fisher Fieldvue DVC6200 Series Digital Valve Controllers," Quick Start Guide, Jan. 2014, 68 pages.
ST Microelectronics, "Dynamic NFC/RFID tag IC with 16-Kbit EEPROM, energy harvesting, FC bus and ISO 15693 RF interface," Datasheet-Production Data, Jun. 2013, 143 pages.
Intelleflex, "Comparison of Intelleflex Semi-passive BAP, Active, and Passive RFID," 2015, [http://intelleflex.com/Products.Semi-Passive-vs-Active-RFID.asp], retrieved on Sep. 16, 2015, 1 page.
Daniel M. Dobkin, "The RF in RFID: UHF RFID in Practice," Newnes, Nov. 1, 2012, Burlington, MA, p. 38.
Daniel M. Dobkin, "The RF in RFID: UHF RFID in Practice," Newnes, Nov. 1, 2012, Burlington, MA, p. 40.
United States Patent and Trademark Office, "Notice of Allowance and Fees(s) Due," issued in connection with U.S. Appl. No. 14/297,179, dated Sep. 13, 2017, 14 pages.
United States Patent and Trademark Office, "Final Office Action," issued in connection with U.S. Appl. No. 15/183,439, dated Jul. 26, 2017, 22 pages.
United States Patent and Trademark Office, "Final Office Action," issued in connection with U.S. Appl. No. 14/297,179, dated Nov. 22, 2016, 50 pages.
United States Patent and Trademark Office, "Notice of Allowance and Fee(s) Due," issued in connection with U.S. Appl. No. 14/684,016 dated Jan. 17, 2019, 10 pages.
United States Patent and Trademark Office, "Non-Final Office Action," issued in connection with U.S. Appl. No. 14/684,016 dated Jun. 16, 2017, 61 pages.
United States Patent and Trademark Office, "Final Office Action," issued in connection with U.S. Appl. No. 14/684,016 dated Dec. 26, 2017, 39 pages.
United States Patent and Trademark Office, "Advisory Action," issued in connection with U.S. Appl. No. 14/684,016 dated Mar. 22, 2018, 30 pages.
United States Patent and Trademark Office, "Non-Final Office Action," issued in connection with U.S. Appl. No. 14/684,016 dated May 22, 2018, 53 pages.
United States Patent and Trademark Office, "Non Final Office Action" issued in connection with U.S. Appl. No. 16/427,987, dated May 26, 2020, 40 pages.
United States Patent and Trademark Office, "Final Office Action" issued in connection with U.S. Appl. No. 16/427,987, dated Sep. 10, 2020, 40 pages.
United States Patent and Trademark Office, "Advisory Action" issued in connection with U.S. Appl. No. 16/427,987, dated Nov. 17, 2020, 4 pages.
United States Patent and Trademark Office, "Notice of Allowance and Fee(s) Due" issued in connection with U.S. Appl. No. 16/427,987, dated Jan. 13, 2021, 19 pages.

\* cited by examiner

METHODS AND APPARATUS FOR MULTIMODE REST COMMUNICATIONS IN PROCESS CONTROL SYSTEMS

RELATED APPLICATIONS

This patent arises from a continuation of U.S. patent application Ser. No. 14/684,016, filed on Apr. 10, 2015, now U.S. Pat. No. 10,303,134, which is hereby incorporated herein by reference in its entirety.

This patent includes subject matter related to U.S. application Ser. No. 14/297,179, which was filed on Jun. 5, 2014, and which claims priority to U.S. Provisional Application Ser. No. 61/832,524 filed on Jun. 7, 2013; U.S. Provisional Application Ser. No. 61/951,187 filed on Mar. 11, 2014; and U.S. Provisional Application Ser. No. 61/977,398 filed on Apr. 9, 2014, all of which are hereby incorporated by reference in their entireties.

FIELD OF THE DISCLOSURE

This disclosure relates generally to process control systems and, more particularly, to methods and apparatus for multimode radio frequency sensor tag (RFST) communications in process control systems.

BACKGROUND

Process control systems, like those used in chemical, petroleum or other processes, typically include one or more process controllers communicatively coupled to one or more field devices (e.g., process control devices) via analog, digital or combined analog/digital buses. The field devices, which may be, for example, instruments, valve positioners, switches and transmitters (e.g., temperature, pressure and flow rate sensors), perform process control functions within the process such as opening or closing valves and measuring process control parameters. The process controllers receive signals indicative of process measurements made by the field devices and then process this information to generate control signals to implement control routines, to make other process control decisions, and to initiate process control system alarms.

Information from the field devices and/or the controller is usually made available over a data highway or communication network to one or more other devices or systems, such as operator work stations, personal computers, data historians, report generators, centralized databases, etc. Such devices or systems are typically located in control rooms and/or other locations remotely situated relative to the harsher plant environment. These devices or systems, for example, run applications that enable an operator to perform any of a variety of functions with respect to the process implemented by a process control system, such as viewing the current state of a process, changing an operating state, changing settings of a process control routine, modifying the operation of the process controllers and/or the field devices, viewing alarms generated by field devices and/or process controllers, simulating the operation of the process for the purpose of training personnel and/or evaluating the process, etc. Often, access to the devices or systems is also based on whether they are powered (e.g., not capable of communications without loop power).

SUMMARY

An example method includes receiving operational data, via a modem, from a process control field device; storing, via a data bus, the operational data in a first radio frequency sensor tag (RFST) or a second RFST. The first RFST communicates via a first frequency band and includes a first RFST memory. The second RFST communicates via a second frequency band different than the first frequency band and includes a second RFST memory. The method further includes retrieving via a handheld device, the operational data from at least one of the first RFST or the second RFST while the process control field device is unpowered.

An example apparatus includes an example first sensor tag to retrieve operational data, via a modem and a data bus, from a process control field device. The example first sensor tag includes a memory to store the operational data. The example apparatus also includes a first antenna arranged to communicate with the first sensor tag when the first sensor tag receives operational data, the first antenna to communicate with the first sensor tag via a first frequency band. The example apparatus also includes a first identification device to retrieve the operational data from the first sensor tag, via the first antenna and the first frequency band, while the process control field device is unpowered.

Another example apparatus includes a modem coupled to a microcontroller to receive operational data from a process control field device. The apparatus also includes a first sensor tag coupled to the microcontroller and including a first memory, and a second sensor tag coupled to the microcontroller and including a second memory, the first sensor tag and the second sensor tag to retrieve operational data from the modem via the microcontroller and store the information in the respective first memory and second memory. The apparatus also includes a power manager coupled to a third memory, the first sensor tag, and the second sensor tag, the power manager to control power provided to the third memory when loop power is not provided to allow the third memory to cache operational data to the first memory and the second memory. The apparatus also includes and a first antenna coupled to the first sensor tag and a second antenna coupled to the second sensor tag, the first antenna and the second antenna to provide operational data from the first memory and second memory to a handheld device when loop power is not provided.

BRIEF DESCRIPTION OF THE DRAWINGS

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts.

DETAILED DESCRIPTION

Figure 1:
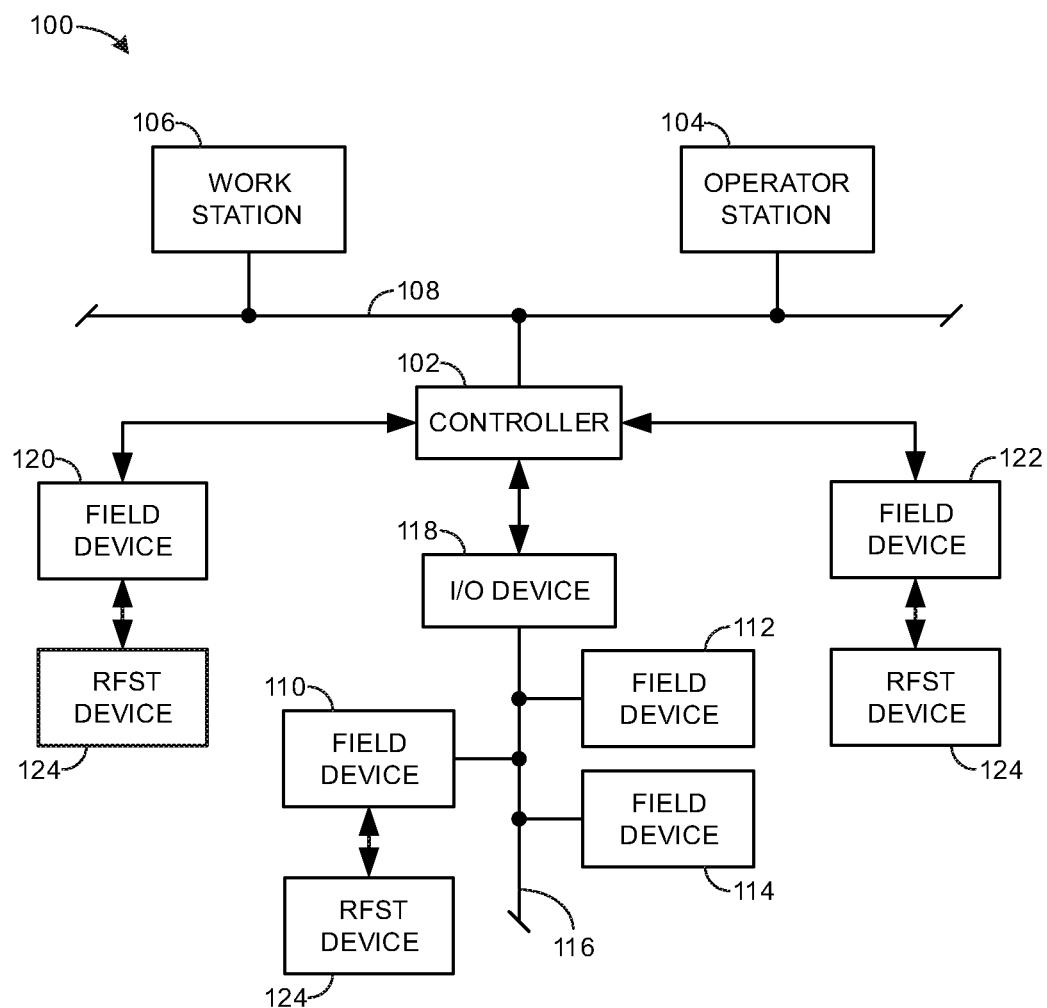
FIG. 1 is a schematic illustration of an example process control system within which the teachings of this disclosure may be implemented.

Methods and apparatus for multimode RFST communications in process control systems are disclosed herein. While field devices (e.g., process control devices) located throughout a process control system may be monitored, along with their corresponding parameters, from a central, remotely located control room, there are circumstances where operators, engineers, and/or other plant personnel are located in the field near the field devices such as, for example, during the inspection, maintenance and/or repair of field devices and/or other control elements within a process plant. Frequently, maintenance and repair is a planned and time-driven plant activity dependent upon swift access to detailed plant information. When field devices and/or final control elements fail, the inability to access technical information necessary to complete the repairs while plant personnel are located in the field near such components can result in costly waste and/or lost production. More reliable equipment and predictive maintenance via prognostic algorithms are goals in current maintenance concepts that require access to robust maintenance and repair information.

Such maintenance programs are often plagued with records and parts ordering systems that contain misfiled, out-of-date, incomplete and/or inaccurate records. Further, without an integrated enterprise solution, data can be located in multiple physical locations and/or housed in electronic data records that are not quickly accessible by maintenance personnel during a walk-down, which can be a time-intensive activity. As part of a typical walk-down, every piece of equipment is examined, and nameplate specifications, such as model and serial numbers, are recorded. A detailed set of attributes for each type of equipment also is collected.

Additionally, in maintenance situations where local replacement of a field device is required, device configuration and commissioning can become a significant issue. Specifically, field devices that include embedded microprocessors and/or microcontrollers may have complex configurations that require maintenance technicians to reference technical data stored remotely throughout the enterprise solution. In many such situations, technicians may rely on written records that may not be up to date and/or may be otherwise incomplete or inaccurate. Further, in circumstances where technicians connect to the enterprise solution to retrieve the needed technical data, access to the data can be slow (e.g., based on the communication protocols implemented throughout the enterprise to convey data). In particular, the technicians may need to use low bandwidth networks and/or networks that are undergoing heavy use. Accordingly, in such situations, among other situations where plant personnel are local to the field devices, it is desirable to enable the plant personnel to communicate with the field devices that are able to store or retrieve relevant technical data locally to provide complete and up to date information without depending upon slow communication speeds to retrieve the same information stored at a remote site. It is particularly advantageous to access information related to the field devices and/or information from the field devices when the field devices are off such as during a plant-wide shutdown, for example. In some examples, it is advantageous to be able to change an access tier of a field device and/or temporarily tier a field device for secure communications with the field device.

In some instances, plant personnel carry portable handheld communicators via which they may communicate with and/or interrogate a device of interest. However, in many such instances, physically connecting a portable communicator device to a field device requires the plant personnel to, for example, unscrew and remove a terminal cap of the field device. As a result, access is typically limited to field devices that are out of service because removing a terminal cap from a currently operating field device (e.g., a field device in service) may violate plant safety standards. To overcome this obstacle, intrinsically safe wireless transceivers have been implemented to communicate with field devices and then wirelessly transmit the data elsewhere, such as, for example, a handheld wireless receiver carried by nearby plant personnel.

Although wireless transceivers are an improvement, currently known wireless transceivers suffer from several limitations. For example, many known wireless transceivers rely on power from the control system (e.g., loop power) provided to the corresponding field device to charge batteries and/or capacitors to power wireless transmissions. These power sources may require significant operating costs (e.g., maintenance, replacement and/or service, etc.) where significant numbers of these power sources are required (e.g., typical industrial process areas, etc.). As many field devices are implemented on a reduced power budget as a result of the low voltage signal provided by the power from the control system, wireless communications by many known wireless transceivers are limited to periods of time where sufficient power is available and/or after a period of time where sufficient power has been scavenged from the control system power provided to the field device. As such, many known wireless transceivers are not conducive to high speed communications and/or transfers of significant amounts of data. Further, some devices may use solar power to charge capacitors. However, solar power may not always be reliable depending upon the location and/or environment in which the device is being implemented. Additionally, many known wireless transceivers are in serial communication with a wired modem associated with the particular communication protocol implementing the interaction of field devices within the process control system. As a result, the communication speed of the wireless transceivers is limited to the communication speed of the corresponding protocol, which can be relatively slow (e.g., the well-known HART protocol is limited to 1200 baud). Further, because known wireless transceivers typically rely on control system power to function, wireless transmissions are only possible when the process plant is running and the particular field device is not otherwise unpowered (e.g., not placed out of service due to maintenance). Furthermore, many devices cannot be shipped or transported with batteries such that when these devices are taken out of service to be shipped off for repairs, there is no power source with which to communicate with the devices.

The above obstacles are overcome and high speed local communications with a field device, among various other advantages, are realized through the implementation of the teachings disclosed herein. In particular, the teachings disclosed herein achieve wireless communications through the use of radio frequency sensor tags (RFSTs), which is an extremely energy efficient technology that enables relatively high data transfer rates. The examples disclosed herein allow for multiple RFST modes such as high frequency (HF) and ultra-high frequency (UHF) RFST communications to be integrated onto a RFST module, for example. Additionally or alternatively, low frequency (LF) and super-high frequency (SHF) communications may be integrated onto the RFST module.

Passive RFSTs (e.g. transponders) may receive power from an electromagnetic field (electromagnetic field) generated when communicating (e.g. up to 30 feet) from a nearby handheld radio frequency identification (RFID) reader. Semi-passive RFSTs may use local power (e.g., a secondary source such as a battery or process device loop power) to power internal circuits, but rely on power from a handheld RFID reader for communication to the reader. With the reliance on local power for communications, semi-passive RFSTs can have longer read ranges (e.g., up to 300 feet) than passive RFSTs. In semi-passive modes, information can only be read from the RFST via back scattering, for example. For active RFSTs (e.g. transceivers) and/or portions of RFSTs that operate in an active mode, local power (e.g., loop power) is provided to power both internal circuits and to communicate with the RFID reader. As such, active RFSTs exhibit significantly longer transmission ranges (e.g., up to 1000 feet).

Different implementations of RFST technology depend upon various engineering tradeoffs of features relevant to the particular industry in which the technology is being applied. Such tradeoffs are accomplished by balancing features such as read range, write range, cost, battery life, service life, allowable temperature range, weather resistance, etc. In the context of the process control industry, some performance parameters of particular interest include long distance read/write range, high reliability, and large data capacity. The examples disclosed herein allow multiple RFST modes (e.g., multimode RFST) to increase flexibility and/or reduce shortcomings or tradeoffs often seen in RFST systems. In a first mode, to achieve relatively long ranges, far field or ultra-high frequency (UHF) RFST technology may be implemented, which may operate at a frequency of approximately 850-960 Megahertz (MHz), for example. In a passive mode, UHF RFST (e.g., UHF RFID) technology utilizes backscattering to transmit information at significant ranges without power (e.g., 30 feet).

In a second mode, to achieve closer range communications with additional interface capabilities including write capabilities and/or processor or memory interface capabilities when a process device is unpowered (e.g., an unpowered interface with a processor and/or non-volatile memory), a high frequency (HF) RFST (e.g., HF RFID) and/or near-field communications (NFC) technology, which may typically operate at a frequency of 13.56 MHz, for example, may be used. While the examples disclosed herein describe examples with UHF RFST and HF RFST capabilities, numerous other modes may be used and/or substituted.

In a third mode, low frequency (LF) RFST technology may be used, which may typically operate at 125 kHz and may be powered in a passive mode. While LF RFST technology has relatively low data rates, RFSTs using LF RFST technology are less susceptible to RF interference and can also support a passive mode.

In a fourth mode, a super-high frequency (SHF) RFST technology is used. SHF RFST technology may typically operate at about 5.8 GHz, but can range from 3-30 GHz. SHF RFST technology can also support passive read ranges of a few inches as well as semi-passive modes. While these four modes have been described, this list is not exhaustive and may encompass any other related modes and/or later implementations.

In some RFST implementations or modes, the longer the range of communications, the greater the limit on memory capacity and/or the greater the power requirements are. The examples disclosed herein achieve certain balances between these features that are suitable for applications within the process control industry and allow greater flexibility by supporting multiple RFST modes. The examples disclosed herein allow functionality such as programming, access tiering, data retrieval, command storage, etc. in situations utilizing HF RFST communications (e.g., NFC, HF RFID communications, etc.) where power is not provided to a process device, thereby allowing efficient and quick data transfers even in a plant shutdown condition, for example. By also including UHF RFST capabilities, the examples disclosed herein allow energy efficient, and long-range communications via backscattering, for example. In particular, an RFID reader/writer may read data over relatively long distances from the UHF RFST by backscattering.

In some disclosed examples, a RFST is physically and operatively coupled to a field device (e.g., a process control device) within a process control system. Once data from the field device is gathered, in some such examples, the RFST may transmit the data to a nearby handheld RFID reader based on power received from the electromagnetic field transmitted by the reader while the process device is off, for example. In such examples, because the RFST has passive capabilities (e.g., does not use any power other than from the handheld RFID reader), plant personnel may communicate with the RFST regardless of power being provided to the corresponding field device. Thus, plant personnel can communicate with the RFST when the field device is operating, when the field device or plant is down, or even when the field device is removed from the plant (e.g., for repairs, before installation, etc.). As such, plant personnel local to the field device can wirelessly access data associated with the field device (e.g., data previously communicated from the field device to the RFST or an associated memory) in a manner that maintains the plant safety policy by avoiding the need to unscrew and remove a terminal cap. Additionally, plant personnel can wirelessly access data associated with a field device located beyond safety boundaries and/or otherwise out of direct access by plant personnel (e.g., placed up high on a tower or behind other equipment). In some examples, plant personnel local to the field can wirelessly communicate with (e.g., interrogate, calibrate, etc.) the field device with a handheld reader via the RFST.

In some disclosed examples, a RFST that utilizes and/or partially utilizes control system power and/or loop power is physically and operatively coupled to a field device within a process control system. In such examples, the RFST may draw power from the power provided by the control system to operate and communicate with the field device. In some examples, the power is drawn from 4-20 mA analog signals sent along wires to the field device commonly referred to as loop power. In other examples, the power is drawn from wires along a 24-volt digital bus commonly referred to as network power or bus power. As used herein, loop power and network power are collectively referred to as control system power.

In some examples, energy harvesting (e.g., drawing power from electromagnetic fields, etc.) on a RFST may power or partially power the memory and corresponding processor or integrated circuit of the RFST. In particular, HF communications or near field communications (e.g., based on magnetic induction) are used to communicate with a RFST that has no other power source. Additionally, magnetic induction may be used to power a processor (e.g., an interface processor, an HF RFST integrated circuit, an integrated circuit, a microcontroller, an HF RFID interface, etc.) and/or memory associated with a process control device. In this manner, numerous functions may be performed despite the RFST not drawing process power. For example, the electromagnetic field transmitted from a handheld reader may power high-frequency (HF) communications of the RFST, via an energy harvester of the RFST, to power memory and/or a processor to retrieve data (e.g., serial number information for the process control device, warranty data for the process device, etc.) from the memory, store a command for the process device, store firmware to program the process device, program the process device and/or command a processor of the process device that is unpowered. Such examples using a HF RFST typically involve the RFID reader being positioned within a few inches and up to about one foot from the RFST. The close proximity in such examples provides greater security because an operator accessing the RFST with the reader must be in close proximity to the tag. Further, in some examples when the memory and/or processor of the RFST are control system powered, an electromagnetic field from a handheld RFID reader can be used to solely power the HF antenna. Alternatively, in some examples, a UHF RFST may also utilize energy harvesting.

A passive UHF RFST mode (e.g., a mode in which power is provided solely by an electromagnetic field generated by the RFST reader) of a RFST may have a read range extending up to about 30 feet via backscattering, whereas a semi-passive UHF RFST mode (e.g., a mode in which the power provided may be battery assisted and/or provided by other auxiliary power such as control system power) may have a read range extending a distance up to about 300 feet. While these ranges are possible, some RFSTs may be characterized by longer or shorter ranges depending upon the particular RFST antenna design. The examples disclosed herein take advantage of both the HF RFST capabilities (e.g., access to data in the RFST without loop power, transmission of and/or programming data at close range without loop power, etc.) as well as the UHF RFST capabilities (e.g., longer range unpowered data access via backscattering, active antenna power for increased range, etc.). The examples disclosed herein may also support low frequency (LF) and/or super-high frequency (SHF) RFST capabilities.

In some examples, by taking advantage of control system power, which is available in most all process control system environments, increased memory capacity and increased communication ranges are possible. Additionally, in certain situations where control system power is not available, less memory capacity and/or range may be available due to the limited power that is drawn from an energy harvester for some configurations.

Furthermore, read ranges of up to about 300 feet, as described above, may likely enable plant personnel to be within range of almost any field device regardless of its location (e.g., beyond safety boundaries, up a tower, etc.). Also, the ability to read data via backscattering ranges of about 30 feet is also advantageous because the plant personnel may still access a typical field device well out of reach (e.g., in a corridor, on another floor, etc.). Further, RFSTs in a semi-passive mode can communicate omnidirectionally such that plant personnel do not have to be at a particular location (e.g., line of sight) within the transmission range to communicate with a RFST associated with a field device, for example.

While RFSTs and/or integrated circuits (e.g., microchips, IC components, RFID integrated circuits, RFID interfaces, etc.) typically have limited onboard memory (e.g., 9 kilobits in some examples and as low as 128-256 bits in other examples), in some examples, as data is gathered from the field device, the data is stored in a separate non-volatile memory that is accessible by the RFST when needed such as, for example, in response to a request via a portable RFID) reader/writer. By gathering and storing the data in this manner, the data is effectively cached for quick retrieval without the limitation of slow communications based on the power consumption requirements of other known wireless transceivers and/or based on the requirements of the communication protocol implemented within the process control system.

Further, the separate non-volatile memory provides extra memory for a corresponding field device. Thus, this additional memory may be used to store additional information related to the identification, maintenance, and/or commissioning of the field device to assist in maintaining and/or repairing faulty devices. In some examples, communications from a central control room may also be written to the non-volatile memory for retrieval by plant personnel during a walk-down and/or at any other time. Additionally, in some examples disclosed herein, the RFSTs are associated with a modem to communicate with the field device, and/or the rest of the process control system according to the particular communications protocol implemented in the control system (e.g., HART). Further, in some examples, a portable RFID reader/writer can be used to update and/or provide additional information to the non-volatile memory for subsequent reference and access. In particular, an HF RFST (NFC) interface may be used to power a processor (e.g., a processor of the RFST, the HF RFST/processor circuit, etc.) and/or memory of a RFST when no loop power is available to the process control system and/or the field device. Further, in some examples, the RFST is fully active such that the antenna is also control system powered and, thereby, enabled to broadcast signals and achieve even greater ranges. Additionally or alternatively, an LF RFST and/or an SHF RFST (e.g., an SHF RFID interface) may be used.

FIG. 1 is a schematic illustration of an example process control system 100 within which the teachings of this disclosure may be implemented. The example process control system 100 of FIG. 1 includes one or more process controllers (one of which is designated at reference numeral 102), one or more operator stations (one of which is designated at reference numeral 104), and one or more work stations (one of which is designated at reference numeral 106). The example process controller 102, the example operator station 104 and the example work station 106 are operatively coupled via a bus and/or local area network (LAN) 108, which is commonly referred to as an application control network (ACN).

The example operator station 104 of FIG. 1 allows an operator, engineer, and/or other plant personnel to review and/or operate one or more operator display screens and/or applications that enable the plant personnel to view process control system variables, states, conditions, alarms; change process control system settings (e.g., set points, operating states, clear alarms, silence alarms, etc.); configure and/or calibrate devices within the process control system 100; perform diagnostics of devices within the process control system 100; and/or otherwise interact with devices within the process control system 100.

The example work station 106 of FIG. 1 may be configured as an application station to perform one or more information technology applications, user-interactive applications and/or communication applications. For example, the work station 106 may be configured to perform primarily process control-related applications, while another work station (not shown) may be configured to perform primarily communication applications that enable the process control system 100 to communicate with other devices or systems using any desired communication media (e.g., wireless, hardwired, etc.) and protocols (e.g., HTTP, SOAP, etc.). The example operator station 104 and the example work station 106 of FIG. 1 may be implemented using one or more work stations and/or any other suitable computer systems and/or processing systems. For example, the operator station 104 and/or work station 106 could be implemented using single processor personal computers, single or multi-processor work stations, etc.

The example LAN 108 of FIG. 1 may be implemented using any desired communication medium and protocol. For example, the example LAN 108 may be based on a hardwired and/or wireless Ethernet communication scheme. However, any other suitable communication medium(s) and/or protocol(s) could be used. Further, although a single LAN 108 is illustrated in FIG. 1, more than one LAN and/or other alternative pieces of communication hardware may be used to provide redundant communication paths between the example systems of FIG. 1.

The example controller 102 of FIG. 1 may be, for example, a DeltaV™ controller sold by Fisher-Rosemount Systems. Inc. of Austin, Tex. However, any other controller could be used instead. Further, while only one controller 102 is shown in FIG. 1, additional controllers and/or process control platforms of any desired type and/or combination of types could be coupled to the LAN 108. In any case, the example controller 102 performs one or more process control routines associated with the process control system 100 that have been generated by a system engineer and/or other plant personnel using the operator station 104 and which have been downloaded to and/or instantiated in the controller 102.

As shown in the illustrated example of FIG. 1, the example controller 102 may be coupled to a plurality of smart field devices 110, 112, 114 via a data bus 116 and an input/output (I/O) gateway 118. The smart field devices 110, 112, 114 may be Fieldbus® compliant instruments, transmitter, sensors, etc., in which case the smart field devices 110, 112, 114 communicate via the data bus 116 using the well-known Foundation Fieldbus protocol. Of course, other types of smart field devices and communication protocols could be used instead. For example, the smart field devices 110, 112, 114 could instead be Profibus® and/or HART® compliant devices that communicate via the data bus 116 using the well-known Profibus and/or HART communication protocols. Additional I/O devices (similar and/or identical to the I/O gateway 118) may be coupled to the controller 102 to enable additional groups of smart field devices, which may be Foundation Fieldbus devices, HART devices, etc., to communicate with the controller 102.

In addition to the example smart field devices 110, 112, 114, coupled via the I/O gateway 118, one or more smart field devices 122 and/or one or more non-smart field devices 120 may be operatively coupled to the example controller 102. The example smart field device 122 and non-smart field device 120 of FIG. 1 may be, for example, conventional 4-20 milliamp (mA) or 0-24 volts direct current (VDC) devices that communicate with the controller 102 via respective hardwired links. In such examples, the hardwired links enable the field device 120 to communicate with the controller 102 and provide electrical power (e.g., loop power, network power) to the field device 120.

Figure 4A:
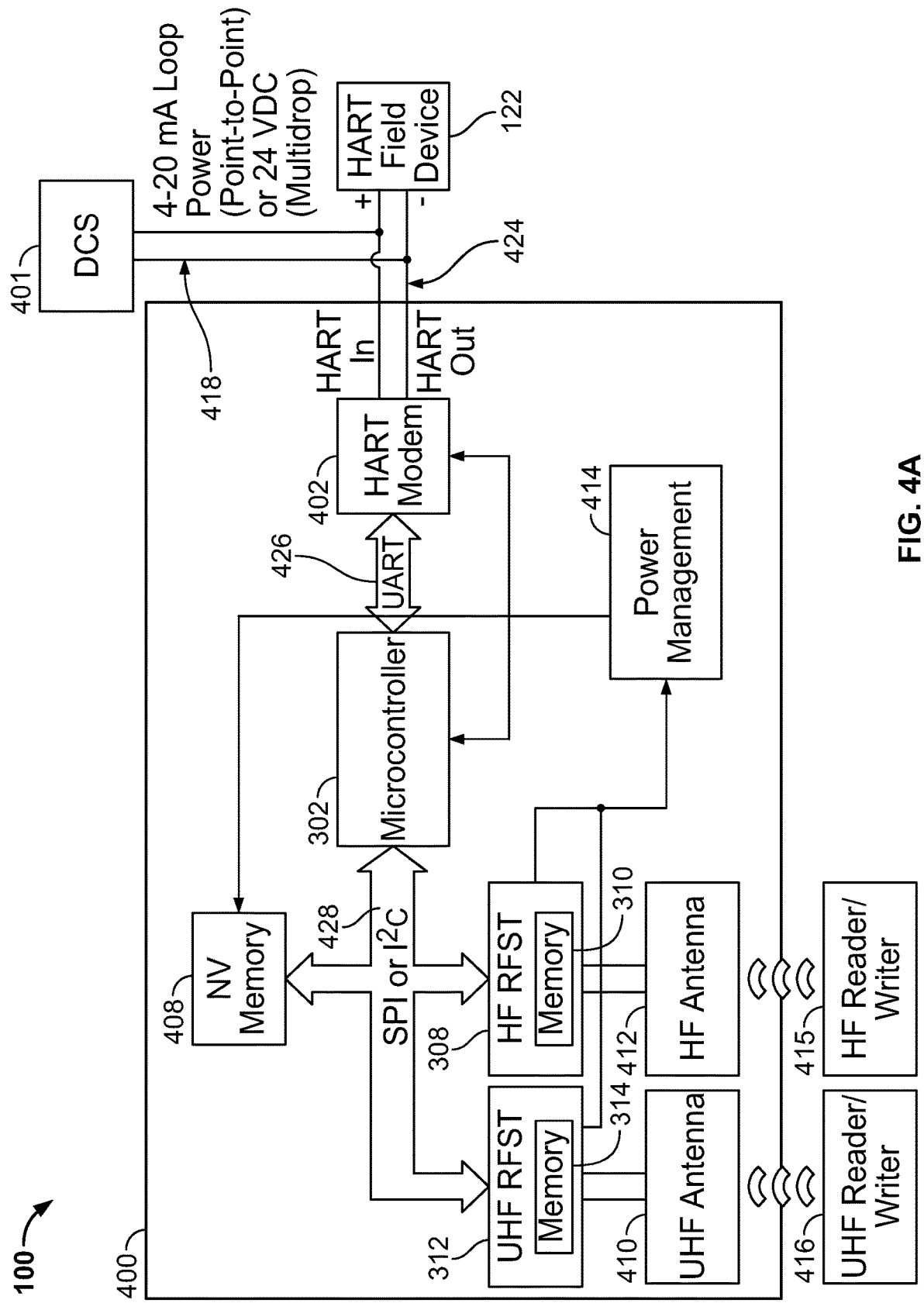
FIG. 4A illustrates another example manner of implementing the example RFST module of FIG. 1.
Figure 4B:
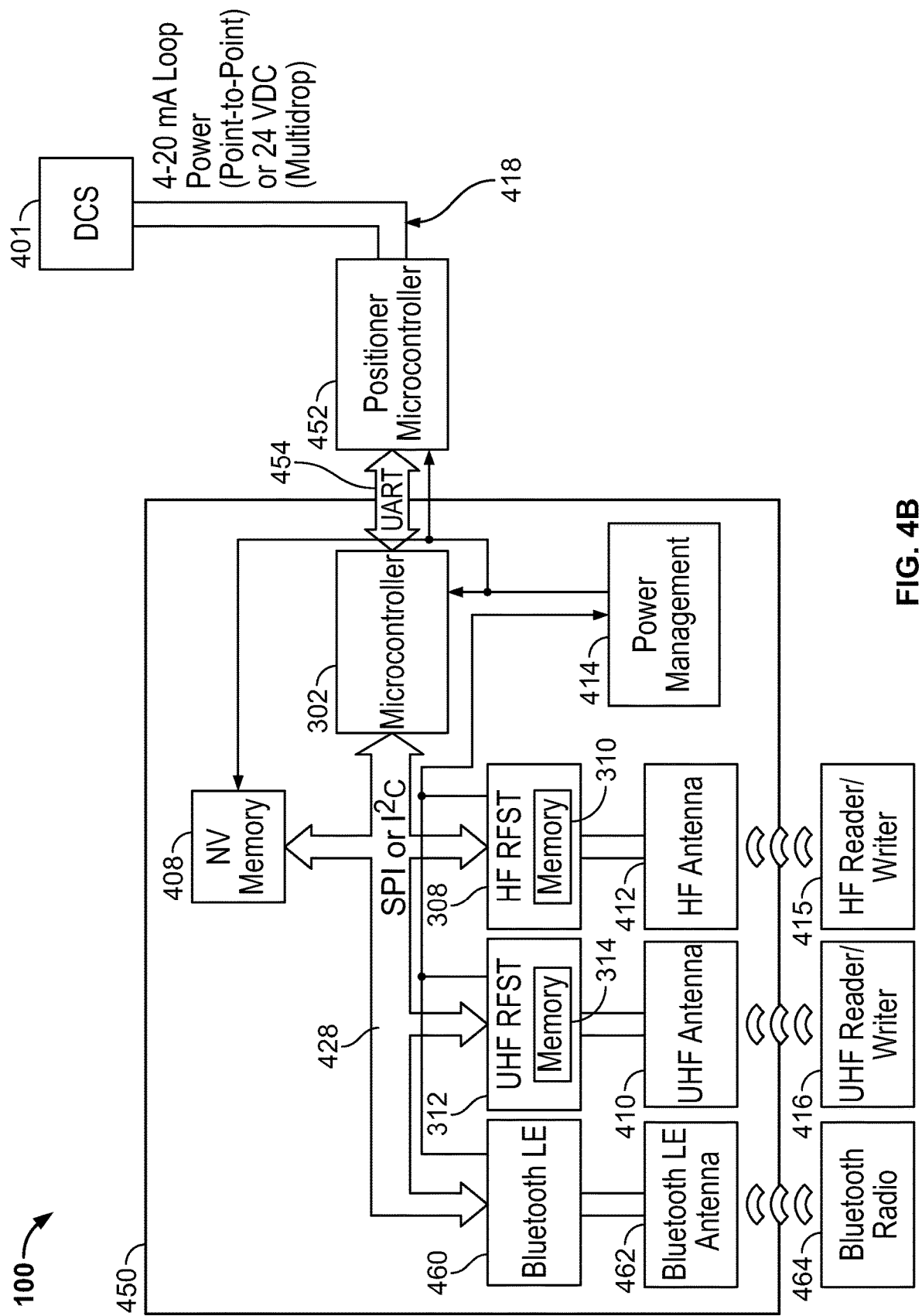
FIG. 4B illustrates yet another example manner of implementing the example RFST module of FIG. 1.

Additionally, each of the field devices 110, 120, 122 is shown in the illustrated example of FIG. 1 coupled to a corresponding RFST (e.g., an RFID module) 124. With respect to the smart field devices 110, 122 in the illustrated example, the corresponding RFST 124 may convert (e.g., via a modem) outbound data obtained from the field devices 110, 122 (e.g., parameter values, diagnostic information, etc.) according to a particular communication protocol associated with the field devices 110, 122 (e.g., HART, Profibus, Foundation Fieldbus, etc.) for transmission to RFID reader/writers 415, 416 (FIGS. 4A, 4B). Additionally, in some examples, the RFST 124 may convert (e.g., via the modem) inbound data obtained from the RFID reader/writers 415, 416 to be transmitted to the field devices 110, 122 and/or other components of the process control system 100 according to the particular communication protocol. In some examples, the RFST 124 does not include a modem and simply stores data obtained from the smart field devices 110, 122 and/or the non-smart field device 120 directly in a memory for transmission to the RFID reader/writers 415, 416. In addition to storing and/or communicating process control data, in some examples, the RFST 124 stores other information (e.g., maintenance records (e.g., alert logs, diagnostic test results, and/or other diagnostic information indicative of the operational health of the field device), parts lists, serial card information, specification sheet, photographs, etc.) associated with the corresponding smart field device 110, 122 or non-smart field device 120 as described in further detail below. In some examples, such information is also communicated to the RFST 124 via the corresponding field device. Additionally or alternatively, in some examples, such data is communicated via the RFID reader/writers 415, 416. In some examples, communications between the RFST 124 and the RFID reader/writers 415, 416 are powered by the RFID reader/writers 415, 416 (e.g., the electromagnetic field of the RFID reader/writers 415, 416 powers the RFST 124). Accordingly, the RFST 124 enables plant personnel to communicate locally and wirelessly with the field devices 110, 120, 122 without requiring power and/or without power consumption requirements that may decrease the power efficiency of the process control system (e.g., by drawing on the control system power) and/or increase maintenance costs (e.g., by requiring the acquisition and/or replacement of batteries). In other examples, the RFST 124 is at least partially powered via the process control system, thereby enabling communications over longer ranges and allowing for greater memory space. In other examples, the RFST 124 is fully powered via the process control system (e.g., in an active RFST mode), to enable the antenna to broadcast transmissions rather than back scattering a signal from the RFID reader/writer. In such examples, significantly longer communications ranges are possible (e.g., up to 1000 feet).

Example manners of implementing the RFST 124 in accordance with the teachings described herein are shown and described below in connection with FIGS. 2A-4B. It should be appreciated that a single RFST 124 may be used to interact with more than one of the field devices 110, 112, 114, 120, 122 by moving the RFST 124 from one device to another as dictated by the circumstances of the process system and the particular needs of plant personnel. Additionally or alternatively, as shown in FIG. 1, multiple RFSTs (e.g. connected individually or combined within a RFST module) may be connected to any or all of the field devices 110, 112, 114, 120, 122. More particularly, in some examples, each field device 110, 112, 114, 120, 122 (or at least some of the field devices) may be coupled to a separate RFST 124 and remain coupled to the corresponding RFST 124 throughout an entire lifecycle, or portion thereof, of the field device. In some such examples, the RFST 124 contains a non-volatile memory 408 (FIGS. 4A, 4B) separate from any memory internal to the corresponding field device 122. In such examples, the RFST 124 is capable of storing serial card data and/or any other data associated with the identification, maintenance, configuration, and/or operation of the field device 122. Typically, the memory within a field device is relatively limited such that much of this information (e.g., documentation and historical records of maintenance, repairs, parts replacements, etc.) has been remotely stored at a central maintenance database for the entire enterprise. However, by coupling the RFST 124 to its own non-volatile memory 408 in accordance with the teachings disclosed herein, this information can be accessed quickly and easily by plant personnel local to the field device (e.g., during a walk-down) with an RFID reader/writer 415 or 416. Furthermore, in such examples, the information associated with the field device 122 stored on the RFST 124 is accessible even when the field device 122 is taken out of service and/or removed from the plant environment (e.g., when shipped off for repairs). Additionally, as described in greater detail below, in some examples, at least some of the information may be stored in a memory of a RFST module 202 (FIG. 2A) within a RFST 200 (FIG. 2A) such that the information can be accessed without a power source to the field device 122 (e.g., when the RFST module 202 is functioning in a passive mode).

In some examples, the RFST 124 is a separable module from the field device 122 and may be replaced with another module and/or upgraded when communications standards, regulatory standards and/or protocols have changed or are updated. Additionally or alternatively, the RFST 124 is interchangeable with different types of field devices. In some examples, a party may access data such as databases, Which may be difficult to access via a network (e.g. a corporate network and/or database system), from the RFST 124. In particular, this data may be accessed from the RFST 124 in situations without power or with loop power.

While FIG. 1 illustrates an example process control system 100 within which the methods and apparatus to communicate with process control system field devices using a RFST described in greater detail below may be advantageously employed, the methods and apparatus described herein may, if desired, be advantageously employed in other process plants and/or process control systems of greater or less complexity (e.g., having more than one controller, across more than one geographic location, etc.) than the illustrated example of FIG. 1.

Figure 2A:
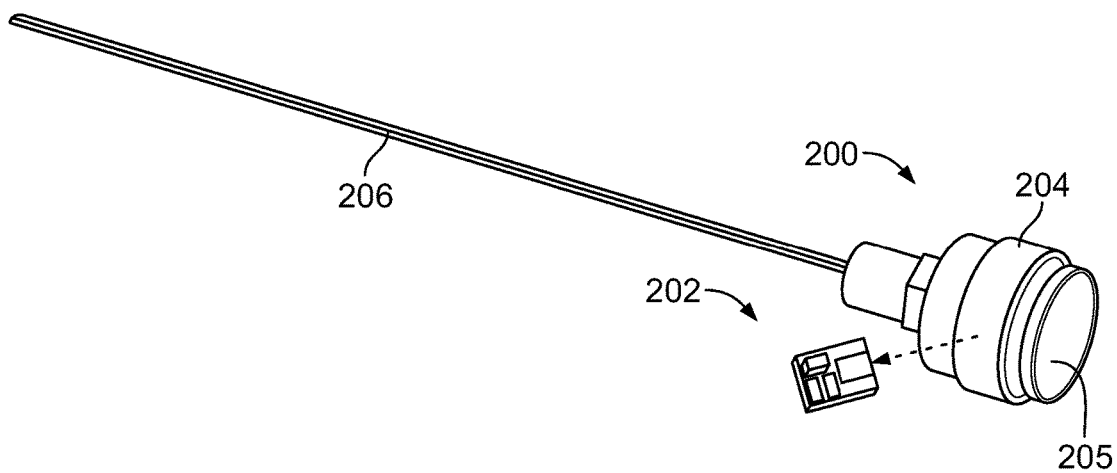
FIG. 2A illustrates an example manner of implementing the example RFST module of FIG. 1 in accordance with the teachings of this disclosure.

FIG. 2A illustrates an example RFST 200 that may be used to implement the example RFST 124 of FIG. 1 in accordance with the teachings of this disclosure. The RFST 200 of the illustrated example includes the RFST (e.g., RFST circuit, RFST circuit board, RFST, the RFST, etc.) 202, which is shown removed from the RFST 200, a housing 204, an antenna cover (e.g., a radome) 205 and communication wires 206 extending out of the housing 204 and electrically coupled to the RFST module 202. The RFST module 202 of the illustrated example is described below in greater detail in connection with FIG. 3. In this example, the RFST module 202 is disposed within the housing 204 and is communicatively coupled (e.g., electrically coupled) and/or wired to an antenna (e.g., a coil antenna) positioned behind the antenna cover 205. In some examples, the RFST module 202 is coupled to two or more antennas (e.g., one for HF communications and another for UHF communications). In this example, the wire 206 is communicatively coupled to the RFST module 202. In other examples, additionally or alternatively, the wire 206 is communicatively coupled to the antenna.

Figure 2B:
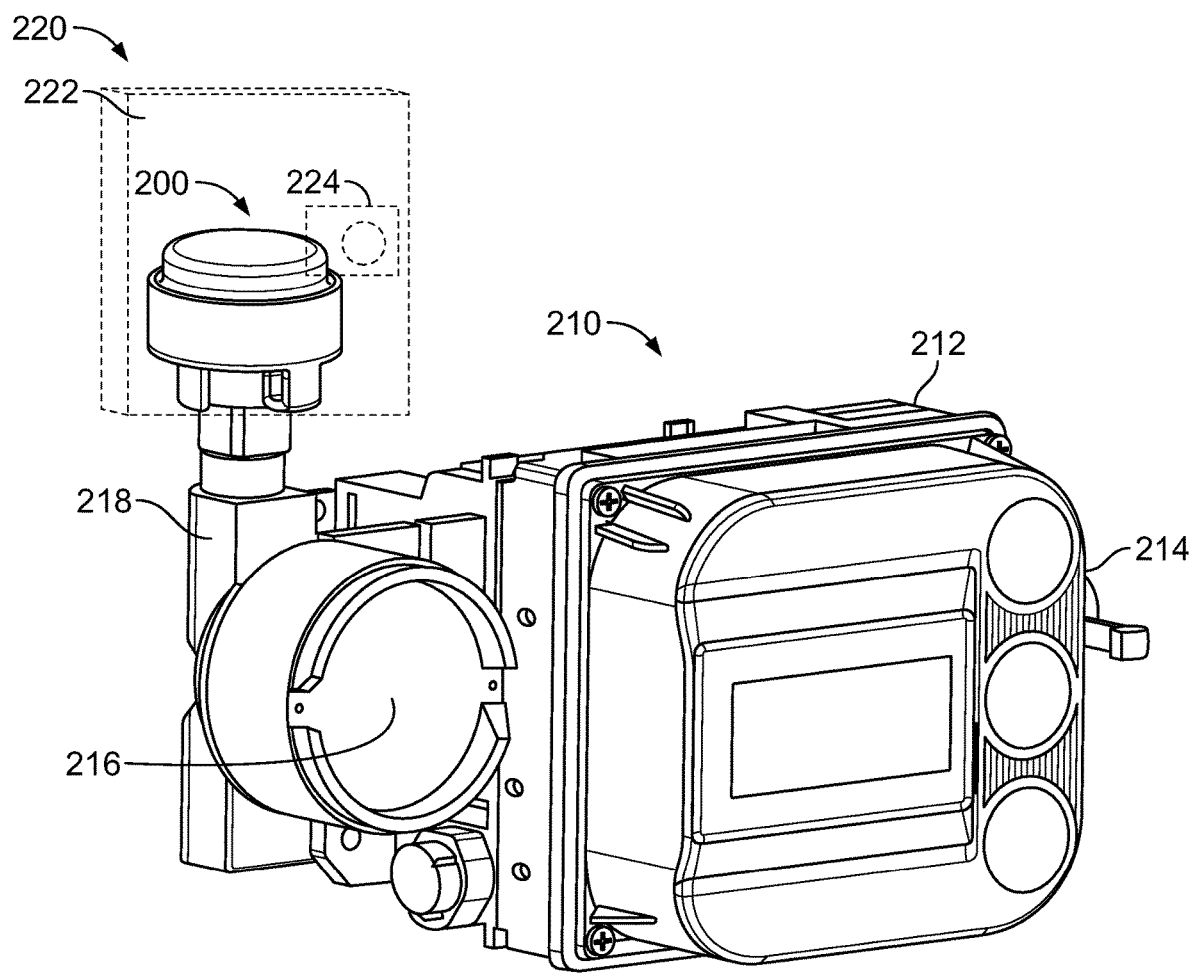
FIG. 2B illustrates an example manner of implementing an example RFST module of FIG. 2A.

FIG. 2B illustrates an example manner of implementing the example RFST 200 of FIG. 2A. In this example, the RFST 200 of the illustrated example is operatively coupled to a digital valve controller 210 such as a FIELDVUE® DVC6200 from Fisher Controls International LLC of Marshalltown, Iowa, for example. The digital valve controller 210 controls an actuator of a valve to control a fluid flow rate through the valve. In this example, the digital valve controller 210 includes a housing 212, a controller portion 214, a terminal interface 216 and a top conduit interface 218. In some examples, a cover or enclosure 220, which may be removed or opened, may be placed on and/or cover the RFST 200 to physically prevent and/or shield communications (e.g., wireless communications) to the RFST 200. Such a measure may prevent unauthorized access to the valve controller 210 and/or a network via which the digital valve controller 210 communicates. In some examples, the enclosure (e.g., cover) 220 has a door 222, which may be opened to access and/or wirelessly communicate with the RFST 200. The door 222 of the illustrated example may have a lock mechanism 224 to prevent physical access to the RFST 200 and/or the valve controller 210.

In operation, a remote RF portable device/source (e.g., a RFID reader/writer, a RFST programming device, etc.) such as the RFID readers 415, 416 described below in connection with FIGS. 4A, 4B may transmit signals to the RFST 200, for example. In this example, the RFID reader generates electromagnetic field and the RFST 200 of the illustrated example may draw power from this electromagnetic field or any other appropriate electromagnetic field source in a passive mode. Additionally or alternatively, the RFST 200 utilizes power from the valve controller 210 by drawing loop power provided to the valve controller 210. Once communication has been established, the RFST portable device may retrieve data stored from memory within the RFST 200 such as serial number information of the valve controller 210, warranty information of the valve controller 210, maintenance or service history of the valve controller 210 and/or configurations of the valve controller 210, etc. In situations where the valve controller 210 is not powered, there may be limitations on the amount of data that can be transmitted to the RFST portable device and/or communication range from the RFST 200 depending on the type of access required. In some examples, a large storage capacitor (e.g., a super capacitor, etc.) may be used to retain a charge over time (e.g., weeks) for the RFST 200.

In some examples, the RFST portable device may program the valve controller 210 and/or store data in a memory located on the RFST 200 or within the valve controller 210, regardless of whether the valve controller 210 is powered or unpowered. In particular, the RFST 200 may harvest energy from an electromagnetic field provided by the RFST portable device to provide power to a processor. The processor, which is associated with the valve controller 210, may be located on the RFST module 202 or within the valve controller 210. Additionally or alternatively, the RFST 200 may use the harvested energy to write data to a memory associated with the valve controller 210. The memory may be located on the RFST module 202 or in the valve controller 210. The data may comprise firmware for the valve controller 210, commands to be executed by the valve controller 210, settings/parameters for the valve controller 210, and/or any other data to be used to operate and/or configure the valve controller 210. In some examples, the RFST portable device may tier the valve controller 210 for diagnostics and/or accessing.

In examples where the enclosure 220 covers the RFST 200, the RFST 200 may be accessed by opening the door 222 and/or removing the enclosure 220 to wirelessly communicate with the RFST 200. In some examples, the enclosure 220 may operate as a Faraday cage to prevent electrical communications to the RFST 200, thereby effectively shielding the RFST 200. Alternatively, any antenna(s) used by the RFST 200 may be placed behind the terminal interface 216 and a cover of the terminal interface 216 may be removed and/or opened to wirelessly access the RFST 200 to prevent wireless communications with the RFST 200, thereby allowing prevention of access to (i.e., communication with) the RFST 200 without need for the enclosure 220.

Figure 3:
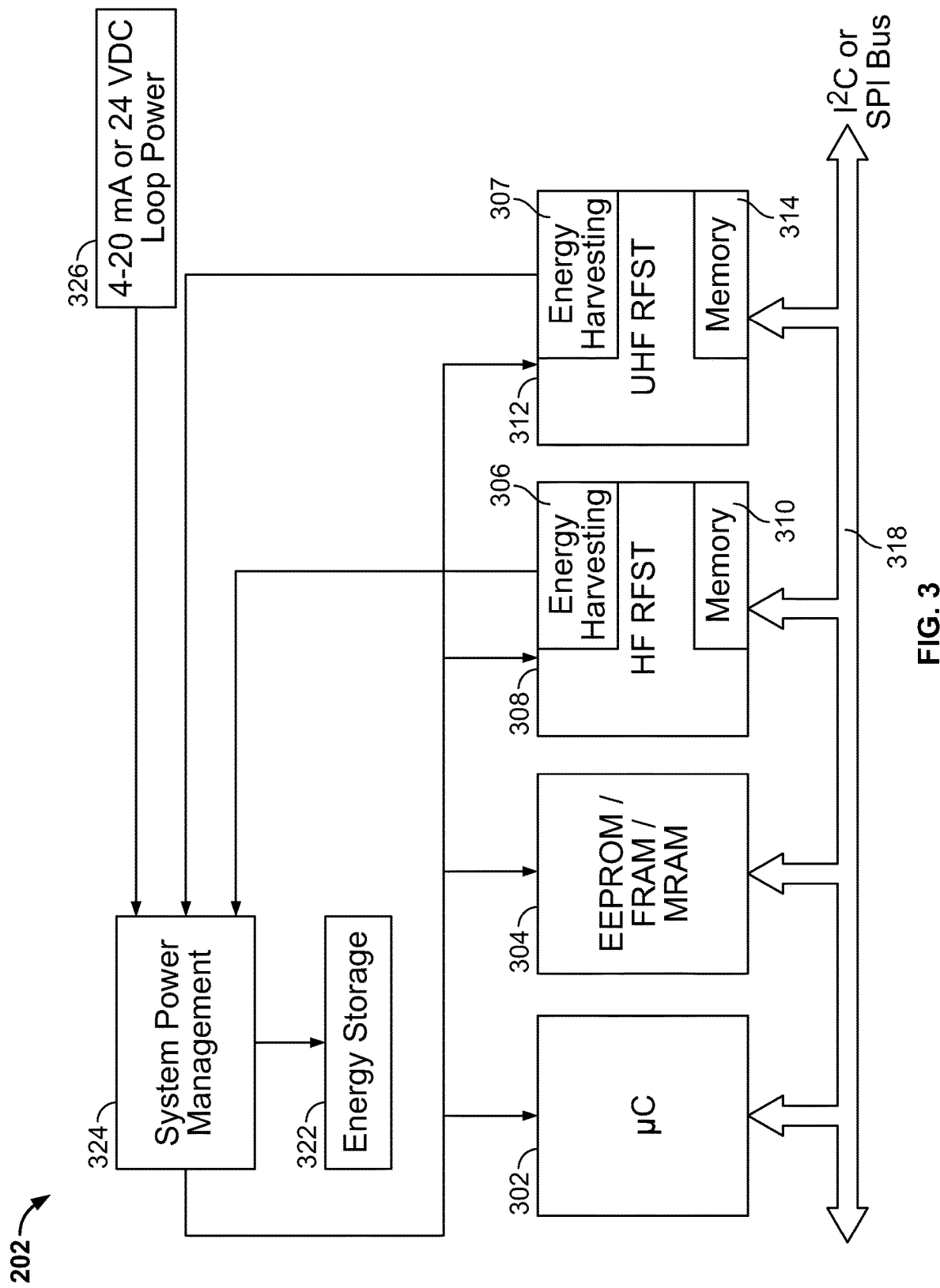
FIG. 3 illustrates another example manner of implementing the example RFST module of FIG. 2A.

FIG. 3 illustrates the example RFST module 202 of FIG. 2A, which includes a microprocessor (e.g., a microcontroller) 302, a memory (e.g., EEPROM, FRAM, MRAM, etc.) 304, which may be integrated with the microprocessor 302, an energy harvesting module (e.g., an energy harvester) 306, an energy harvesting module 307, a high frequency (HF) RFST (e.g., an HF RFST chip, an HF RFST module, an HF RFST integrated circuit, an HF RFID integrated circuit, an HF RFID interface, etc.) 308 on-board memory 310, an ultra-high frequency (UHF) RFST 312 (e.g., a UHF RFST chip, a UHF RFST module, a UHF RFST integrated circuit, a UHF RFID integrated circuit, a UHF RFID interface, etc.) with on-board memory 314. For digital communications, the processor 302, the memory 304, the HF RFST 308, the UHF RFST 312 are electrically coupled to a data interface 318, which may be an I²C interface or a serial peripheral interface (SPI) bus, for example. In some examples, the processor 302, the HF RFST 308 and/or UHF RFST 312 have associated non-volatile memory (e.g., integrated non-volatile memory).

Alternatively, instead of the energy harvesting modules 306 307, the RFST board 202 may be powered by loop power scavenged from a process control device such as the valve controller 210 described above in connection with FIG. 2B. In these examples where power is scavenged from the process control device and/or loop power, RFSTs draw relatively low power (e.g., as low as 50 microwatts) and, thus, allow advantageous power savings even in power scavenging. In other examples, the RFST module 202 is powered by a battery or a capacitor for semi-passive operation. Additionally or alternatively, the RFST module 202 includes an energy storage device 322 to provide semi-passive capabilities to the UHF RFST 312, for example, by storing energy harvested by the energy-harvesting module 306 and/or the energy-harvesting module 307. In some examples, the system power management circuitry 324 controls power from the energy-harvesting modules 306, 307 and/or a loop power source 326, which is supplied from the process control system, for example. In this example, the system power management circuitry manages power from the energy-harvesting modules 306, 307 prior to distributing power throughout the RFST module 202.

Alternatively, the RFST module 450 (FIG. 4B) includes system power management circuitry 414 controls power from the energy-harvesting RFSTs 308, 314 distributing power throughout the RFST module 450 and through an additional power bus to the positioner microcontroller 452 to operate the electronics of the positioner microcontroller 452.

In some examples, the memory 310 and/or the memory 314 may have an approximate capacity of about 9 kilobits (kbits). While the energy-harvesting modules 306, 307 are shown electrically coupled to the HF RFST 308 and the UHF RFST, respectively, either or both of the energy-harvesting modules 306, 307 may be integral with any of the components on the RFST module 202 or may be a separate discrete part placed onto the RFST module 202. In this example, the energy-harvesting modules 306, 307 are associated and/or integrated with the HF RFST 308 and the UHF RFST, respectively. In this example, the energy harvesting modules 306, 307 are used and/or partially used for power in a passive (e.g., pure energy harvesting/passive mode) or partial mode (e.g., where loop power is additionally used in conjunction with harvested power). In other examples, only one of the HF RFST 308 or the UHF RFST has an energy harvester. In yet other examples, a RFST does not have energy harvesters and primarily relies on provided loop power.

While the example RFST module 202 utilizes the HF RFST 308 and the UHF RFST 312, any combination of RFSTs may be used. Additionally or alternatively, an LF RFST and/or an SHF RFST may be used, or any combination thereof. In some examples, only a single RFST is used.

FIG. 4A illustrates an example RFST (e.g., RFST module, RFST, RFST, etc.) 400 that may be used to implement the example RFST 124 of FIG. 1. In the illustrated example, the RFST module 400 is connected to the field device 122 of the process control system 100 of FIG. 1 (the remainder of which is represented by the distributed control system (DCS) block 401). In the illustrated example, the RFST module 400 includes a HART modem 402, the microcontroller 302 having integrated random access memory (RAM) (e.g., the memory (RAM) 304), the non-volatile (NV) memory 408, the HF RFST 308, the UHF RFST 312, a UHF antenna (e.g., a patch antenna, a monopole or dipole antenna, a coplanar waveguide, a substrate integrated waveguide, etc.) 410 and an HF antenna (e.g., a coil antenna) 412. In some examples, the HF RFST 308, the UHF RFST 312, the non-volatile memory 408, the HF antenna 412 and/or the UHF antenna 410 are all incorporated onto a single integrated circuit (IC). The RFST module 400 of the illustrated example also includes power management circuitry 414, which may be an integrated component, to power the RFST module 400. In this example, the power management circuitry 414 may utilize energy harvesting, partially draw power from the DCS 401 (e.g., different portions of the RFST module 400 are powered by loop power, whereas other portions of the RFST module 400 are powered by harvested enemy) and/or fully draw power from the DCS 401 (e.g., scavenge power).

In the illustrated example of FIG. 4A, the field device 122 is identified as a HART-compliant field device. As stated above, the teachings of this disclosure may be implemented in connection with a field device associated with any suitable communication protocol (e.g., Fieldbus, Profibus, etc.). In some examples, a HART communication protocol is not used and/or a HART modem is not used. However, the following disclosure is explained by way of example in terms of the HART communication protocol. Thus, as shown in FIG. 4A, the HART field device 122 is operatively coupled to the DCS 401 via a pair of signal wires 418 to communicate according to the HART protocol. In addition to transmitting and receiving control signals over the signal wires 418, the field device 122 also draws its power from the signal wires 418 (e.g., the field device 122 is control system powered, which in the context of the HART protocol means 4-20 mA loop powered and in the context of the Fieldbus protocol means 24 VDC network power). Additionally, in the illustrated example, the RFST module 400 is linked to the signal wires 418 such that the HART field device 122 is operatively coupled to the RFST module 400 via the HART modem 402 and to enable the RFST module 400 to draw power from the control system power provided via the signal wires 418. In some examples, communications occur between the RFST module 400 and the field device 122. Additionally or alternatively, in some examples, communications occur between the RFST module 400 and the DCS 401. In such examples, communications from the RFST module 400 relative to communications from the field device 122 are managed and/or distinguished by the DCS 401 based on individual addresses assigned to each of the RFST module 400 and the field device 122 (e.g., in a multi-drop configuration). That is, in such examples, the RFST module 400 and the field device 122 are treated as separate instruments within the process control system 100 connected along the 2-wire connection 418. In some examples, the RFST module 400 may be coupled to a HART compliant field device although the DCS 401 is not implemented using the HART protocol. In such examples, the RFST module 400 may not communicate with the DCS 401 and instead would communicate with the field device. Although the RFST module 400 in FIG. 4A is shown as being independently connected to the signal wires 418, in some examples, the RFST module 400 is coupled to the signal wires 418 via the field device 122.

The example HART modem 402 is configured to receive information from the HART field device 122 according to the HART protocol (or any other suitable communication protocol) and transmit that information to the microcontroller 302 according to a serial communication protocol (e.g., universal serial bus (USB), Ethernet, synchronous serial (e.g., serial peripheral interface (SPI) bus), etc.). Additionally, the example HART modem 402 is configured to receive information from the microcontroller 302 according to the serial communication protocol and transmit that information to the HART field device 122 and/or to the DCS 401 according to the HART protocol.

The example microcontroller 302 controls the timing and/or scheduling of data sent to and/or from the field device 122 and/or the RFST module 400. In some examples, the data includes requests to poll information (e.g., process variable values, alarms, etc.) from the field device 122. In other examples, the data includes commands instructing the field device 122 to implement certain functionality (e.g., tuning, calibration, diagnostics, commissioning, etc.). Data received by the microcontroller 302 of the illustrated example may be stored temporarily in RAM, which is integrated with the microcontroller 302 in this example, and/or stored over a relatively longer term in the non-volatile memory 408. Additionally or alternatively, the data received by the microcontroller 302 may be sent to the HF RFST 308 for subsequent storage in the corresponding HF RFST onboard memory 310 and/or transmitted to the external RFID reader/writer 415 via the HF antenna 412. Likewise, the data received by the microcontroller 302 may be sent to the UHF RFST 312 for subsequent storage in the corresponding UHF RFST memory 314 and/or transmitted to a UHF RFID reader/writer 416 via the UHF antenna 410. In some examples a single reader (e.g., capable of both UHF and HF RFST communications) may communicate with the UHF RFST 312 and the HF RFST 308.

Communications between the field device 122, the HART modem 402 of the RFST module 400, and/or the DCS 401 are relatively slow or low speed because the communications are governed by the HART protocol, which is limited to about 1200 baud. In contrast, the communications between the other elements illustrated in FIG. 4A are relatively high speed in that they are based on a high speed serial communication protocol (e.g., SPI bus, $I^2C$, etc.), which may achieve approximately 115 kbps or higher. Thus, by implementing the example RFST module 400 in accordance with the teachings disclosed herein, relatively slow HART based communications may be monitored over time and cached or stored in the non-volatile memory 408, the HF RFST onboard memory 310 and/or the UHF RFST onboard memory 314 for subsequent access by plant personnel handling a RFID reader/writer (e.g., the RFID reader/writers 415, 416 shown in FIG. 4A) at a much faster rate via the serial bus communication protocol.

In some examples, the communications associated with the field device 122 and the HART modem 402, (represented in FIG. 4A by lines 424) require power from the DCS 401 via the signal wires 418 to operate (i.e., these components are loop powered). In contrast, in some examples, the communications (e.g., high-speed communications within the RFST module 400 (represented by arrows 426 and 428), which may use the SPI bus protocol or the universal asynchronous receive/transmit (UART) protocol, and the wireless communication between the HF RFST 308 or the UHF RFST 310, and the RFID reader/writers 415, 416 do not require control system power (e.g. loop power). Rather, the RFST communications in the illustrated example may draw power from either of the MD reader/writers 415, 416 via inductive or radiative coupling. Thus, not only may the RFST module 400 function without loop power, the RFST module 400 may function without a battery supply or charged capacitors (e.g., which may be charged based on available loop power) such that data stored in the HF RFST onboard memory 310, the UHF RFST onboard memory 314 and/or the non-volatile memory 408 of the RFST module 400 is accessible any time the RFST any of the reader/writers 415, 416 are within range of the HF RFST 308 and/or the UHF RFST 310. Additionally or alternatively, in some examples, the RFST module 400 is provided with a battery supply and/or a capacitor for redundancy or backup power and/or to allow the UHF RFST 312 to operate in a semi-passive mode (e.g., for increased range) when control system power is unavailable.

The capability to power the RFST module 400 with harvested power allows functionality such as data retrieval (e.g., serial number retrieval, etc.), programming and/or firmware uploads to the field device 122 to occur in situations where there is no power provided by the DCS 401 (e.g., during plant shutdowns). Even in examples without energy harvesting (e.g., the power management 414 strictly utilizes loop power and/or there is no available energy harvesting, etc.), the HF RFST 308 and the UHF RFST 312 provide low power and relatively fast communications, thereby saving power and/or reducing the power draw and, thus, reducing overall operating costs of these systems.

In some examples, the amount of data that can be stored onboard the RFST module 400 (e.g., within the HF and UHF RFST onboard memory 310, 314) is relatively limited because the components of the RFST module 400 are powered by the RFID reader/writers 415 or 416. For example, known passive UHF RFSTs typically have an upper memory threshold of 32 kilobytes. However, with RFST technology there may be a tradeoff between the amount of memory available and the range over which data stored on the memory can be accessed wirelessly via a RFID reader/writer. In some examples, using the 32 kilobytes of memory may limit the UHF RFST communication range to around 2 feet.

For UHF RFSTs in a passive mode, smaller amounts of memory (e.g., 512 bits) can allow ranges exceeding 30 feet (the range may also depend upon the antenna design of the RFST) via backscattering, for example. In some examples, a range of 2 feet may be acceptable. However, in other examples, where a field device is not readily accessible by plant personnel in the field (e.g., is placed up high, located behind other equipment, beyond safety boundaries, etc.) and/or not powered, the RFST onboard memory 314 of the RFST module 400 corresponding to such a field device may only contain 512 bits of data, which may enable a range of approximately 30 feet for the UHF RFST 312. However, when powered by loop power, the UHF RFST 312 of the illustrated example may allow greater ranges (e.g., 150-300 feet) while supporting a greater memory threshold such as 9-32 kilobytes. In this example, the combination of the UHF RFST 312 and the HF RFST 308 allows different ranges to be supported on a single RFST while also allowing different power conditions to be accommodated. For example, in a scenario without loop power, the UHF RFST 312 may allow read ranges of approximately 30 feet while the HF RFST 308 may allow close-range (e.g., under a foot of distance) data transfers and/or processor control.

In some examples, the UHF RFST 312 may be coupled to a powered antenna. In particular, the UHF antenna 410 of the illustrated example may be powered by loop power to further increase the range of the UHF antenna 410. In particular, the UHF antenna 410 may utilize a low-power Bluetooth transmitter, a wireless personal area network (WPAN) protocol, Wi-Fi, Zigbee or any other appropriate protocol or standard of actively powered transmission.

In contrast, HF RFSTs can generally accommodate a range of about 0.25 to 4 inches (in) in a passive mode (e.g., being powered by a RFID reader/writer, etc.). Some HF RFSTs, however, allow a semi-passive mode via a battery, for example, in which the semi-passive mode may allow greater ranges.

Accordingly, the terms "local," "near," "nearby," and related terms associated with the location or position of plant personnel and/or a RFID reader/writer relative to a field device are expressly defined as being within the maximum range of communication between the RFID reader/writer and a RFST physically coupled to the corresponding field device.

While the memory of the RFST module 400 associated with the RFSTs 308, 312 (e.g., the HF RFST onboard memory 310 or the UHF RFST onboard memory 314) is relatively limited, the non-volatile memory 408 associated with the microcontroller 302, in some examples, can be any size (e.g., megabytes or gigabytes of memory) within the constraints of manufacturing capabilities. In examples where energy harvesting is utilized, the RFID readers/writers 415, 416 may power writing and/or reading the non-volatile memory 408 via the HF RFST 308 and the UHF RFST 310 by emitting electromagnetic fields. In some examples, the non-volatile memory 408 is removable and replaceable (e.g., similar to an SD card) to enable the end user to select the desired amount of memory. In this manner, additional information related to the field device 122 can be stored that may otherwise be unavailable due to the limited memory space of the field device 122. For instance, in some examples, the non-volatile memory 408 stores maintenance and/or repair information gathered over the entire lifecycle of the field device 122 (or any portion thereof). Such information may include recommended parts lists, photos, model/serial number of the field device and/or associated parts, maintenance instructions and/or procedures, as well as a historical archive of the nature and timing of any device failures and resulting maintenance response (e.g., error signals, alerts/alarms, diagnostic test results, part replacements, etc.). In this manner, whenever maintenance technicians are examining the field device (e.g., during a routine walk-down, because of a device failure, or as part of turnaround planning), they will have immediate and ready access to all relevant information to be able to assess the situation and/or implement appropriate next steps. Furthermore, in this manner, the same relevant information is even accessible if the device has been removed and relocated from the plant for the purposes of repair and/or more exhaustive diagnostic testing. In some examples, the aforementioned data may be stored or partially stored in the on-board memories 310, 314 of the HF and UHF RFSTs 308, 312, respectively.

Further, in some examples, the communication between the microcontroller 302 and the HF and UHF RFSTs 308, 312, respectively, may or may not use loop power such that not everything that can be stored in the non-volatile memory 408 associated with the microcontroller 302 will be available to the RFST module 400 even when there is no power provided to the RFST module 400. Accordingly, in some examples, a subset of the data obtained from the field device 122 at is likely to be of the most benefit when there is no power is stored directly on the RFST module 400 in the HF RFST onboard memory 310, UHF RFST onboard memory 314 and/or the non-volatile memory 408. Even though it is unlikely that the RFST module 400 can store all data gathered from the field device 122 because the amount of memory required may exceed the memory available in the RFST onboard memory 310 and 314, caching the data from the non-volatile memory 408 still provides the advantage of wirelessly accessing the data (via the RFID reader/writers 415, 416) at communications speeds much higher than possible if the field device 122 were polled directly, which is subject to the relatively slow communication speed of the HART protocol.

However, in some examples, loop power may be used to enable the RFST module 400 to communicate with the microcontroller 302 and access the non-volatile memory 408. Thus, in some examples, when the microcontroller 302 and the non-volatile memory 408 are loop powered, the RFID reader/writers 415, 416 may access all of the data stored on the non-volatile memory 408. Alternatively, in some examples, energy harvested from an electromagnetic field provided by the RFST readers/writers 415, 416, for example, may be used to power the microcontroller 302 and/or the non-volatile memory 408 to write to the non-volatile memory 408, for example. In other words, the RFST module 400 may function in a fully passive mode without using loop power. In some examples, the HF RFST antenna 412 and the UHF RFST antenna 410 are powered by an energy harvester, while the remaining components of the RFST module 400 are loop powered. Alternatively, the HF RFST antenna 412 and/or the UHF RFST antenna 410 may be powered by the loop power, while the remaining components of the RFST module 400 are powered by the energy harvester. In some examples, the RFST module 400 is powered by a battery or a capacitor. Additionally or alternatively, other power conversion devices may be used that utilize solar energy, vibrational energy or heat energy, etc.

Implementing communications via RFST technology in accordance with the teachings disclosed in connection with FIG. 4A has several advantages. First, RFST transmissions can occur whenever they are desired and plant personnel have a RFID reader/writer that is within a suitable range, whereby the range may vary based on whether the process control system 100 is powered and/or if loop power is flowing through the process control system 100. That is, RFST communications between the RFST module 400 and the RFID reader/writers 415, 416 of the illustrated example are not dependent on the process control system 100 being in operation and powered up. In fact, in some examples, programming and/or data access may occur at close range via the HF RFST 308 without loop power, for example. Additionally or alternatively, data reads may occur at longer ranges via the UHF RFST 312 via backscattering without loop power. In contrast, other known wireless radio transceivers used in process control systems (e.g., based on a ZigBee communication protocol) require a significant amount of power, which is often scavenged from available loop power provided to the corresponding field device over time until capacitors associated with the transceiver are sufficiently charged to power a signal transmission. Due to the tight power budget frequently associated with the low voltage power source provided to field devices, a delay of up to a minute may be needed to harvest sufficient power to transmit a HART command Under such constraints, the types (and amounts) of wireless communications possible are significantly limited (e.g., to providing basic control information such as values for process variable, and/or other key parameters). For example, diagnosing and/or configuring a HART field device can involve well over 1000 HART commands. At approximately one HART command per minute, ZigBee based wireless transceivers are not practical for such purposes. However, because RFST technology uses no other power than what is provided by a RFID reader/writer (e.g., in a passive mode), data can be freely communicated (e.g., transmitted or received) whenever the RFID reader/writer is within range of the antenna of a RFST. In examples without energy harvesting (e.g., actively powered systems, etc.), the combination of the HF RFST 308 and the UHF RFST 312 allows for significant power savings while allowing high-speed wireless communications. In general, the combination of the HF RFST 308 and the UHF RFST 312 also allows for great flexibility in communications regarding a wide range of power conditions and/or communication needs.

As mentioned above, another advantage of using the RFST module 400 of the illustrated example is to enable wireless communications even if the DCS 401 is shut down, the field device 122 is taken out of service, and/or power is otherwise cut off. Thus, not only can the RFST module 400 communicate with the RFID reader/writers 415, 416 when the field device 122 is without power, the same communications are still available even when the field device is taken offsite (e.g., when being shipped off for repairs) and/or before being installed and commissioned in a control system.

Inasmuch as such communications are made without loop power, the corresponding data in such examples is stored onboard the RFST module 400 (e.g., in the RFST onboard memory 310, 314). In such examples, due to the memory constraints of the RFST module 400, only the data that is most likely to be desired when there is no power is stored in the RFST module 400 (e.g., serial number data, device product identifiers or numbers, etc.) such that additional data gathered in regards to the field device 122 may be stored in the non-volatile memory 408. In some examples, the data stored in the RFST module 400 for passive data transfers with limited memory capabilities is associated with the identification (e.g., serial card data), maintenance (e.g., historical records of repairs, part replacements, diagnostic tests, etc.), and/or commissioning and/or configuring (e.g., operational settings and/or tuning parameters) of the field device 122.

Storing such information on the RFST module 400 is advantageous because the data can be used to improve the accuracy and speed with which the field device 122 may be repaired (many cases of which involve the field device being unpowered). For example, by storing the serial number of the field device 122 on the RFST module 400 (which, in some examples, is physically attached to the field device even during shipping for repairs), the field device 122 can be identified during the shipping process (e.g., when it is crated on a truck) to reduce the potential of the field device 122 becoming lost and/or confused with another device.

Further, in some examples, the maintenance data associated with the field device 122 is stored on the RFST onboard memory 310, 314 of the RFST module 400 may include the date of manufacture, part numbers and/or a parts list (e.g., based on an engineering master (EM) string to reduce memory requirements), spare parts recommendations, a specification sheet, images/photos of the field device 122 and/or corresponding parts, and/or maintenance records (e.g., the date of last maintenance and/or calibration, the date when the field device 122 was first installed, the date(s) of diagnostic tests and their results, alert logs, etc.). In accordance with the teachings disclosed herein, any or all of the above forms of maintenance data may be accessible before the field device 122 is coupled to a power supply to facilitate the ordering of parts and/or the speed at which issues may be assessed and the field device 122 repaired.

Further, the communication speed of wireless transmissions using the RFST module 400 is much faster than other known wireless transceivers in a process control system. For example, in a wireless HART context, known transceivers are typically configured in serial communication with a wired HART modem such that the transceiver is limited to the speed of the HART protocol associated with the modem (e.g., 1200 baud). In contrast, the RFST module 400 of FIG. 4A is configured according to a high speed serial bus communication protocol that provides much faster communications. Thus, while communications that are associated with data stored in the non-volatile memory 408 may depend upon loop power depending on whether energy harvesting is available and to what extent energy harvesting is able to provide power, the speed at which data (previously polled from the field device 122) can be accessed is significantly faster than polling the field device 122 directly.

A related advantage of the RFST module 400 arises from the fact that high speed communications with relatively long ranges are possible while the field device is powered. Frequently there is a no-touch rule in effect for process control equipment when the process is in operation such that engineers or other maintenance personnel can only access alerts, alarms, or diagnostic data for a field device via the plant database. While this information is accessible from a control room and/or remote terminal in a maintenance shop, such information is largely unavailable when personnel are local to the field device because known wireless transceivers are limited (e.g., by the speed/frequency of communications, as described above) and establishing a hardwired connection to a field device may require unscrewing a terminal cap (which may violate a plant safety policy) and/or taking the field device out of service, thereby disrupting operations of the plant. However, with the example RFST module 400, the high communication speeds and the wireless nature of the communications overcomes these obstacles for personnel with a handheld RFID reader/writer (e.g., the RFID reader/writers 415, 416) at or near the location of the field device 122.

Additionally, in some examples, the RFST module 400 may store the particular asset tag for the field device 122 and/or other data related to commissioning and/or configuring the field device 122. Generally, when a field device is commissioned or configured, a field technician executes a series of tests to verify the functionality of the field device and subsequently configures and calibrates the field device by storing operational settings in the field device for installation into the process plant. In some examples, such operational settings to configure and calibrate the field device are stored within the RFST onboard memory 310, 314 of the RFST module 400. In such examples, should the field device fail or otherwise need replacing, plant personnel can quickly retrieve the operational settings from the failed device (via the RFID reader/writers 415, 416) and load them on another RFST module 400 corresponding to a replacement field device. In other examples, the RFST module 400 may be taken from the removed field device and coupled to the replacement field device to provide the stored operational settings directly to the new replacement device. By implementing either of the above examples, the time efficiency for switch outs of replacement field devices may be significantly improved. That is, the typically manual process of validating and/or populating variables and other parameters to commission and configure the field device 122 can be automated to significantly reduce labor costs and improve accuracy by reducing written errors. Furthermore, in some examples, a field device the field device 122) may be temporarily replaced or removed from service while it is repaired before being re-installed within the process system. In some such examples, if any data associated with the field device 122 changes after being repaired, the memory in the RFST module 400 may be updated (while the field device 122 is powered) such that the new information is accessible (via the RFID reader/writers 415, 416) before the field device 122 is re-installed and re-commissioned in the process control system 100.

While the example RFST module 400 utilizes the HF RFST 308 and the UHF RFST 312, any combination of RFSTs may be used. Additionally or alternatively, an LF RFST and/or an SHF RFST may be used, or any combination thereof. In some examples, only a single RFST is used.

FIG. 4B illustrates another example RFST module 450 that may be used to implement the example RFST 124 of FIG. 1. The RFST module 450 of the illustrated example is communicatively coupled to a positioner microcontroller 452 via a universal asynchronous receiver/transmitter (UART) interface 454. Similar to the RFST module 400 of FIG. 4A, the RFST module 450 includes the microcontroller 302 with integrated random access memory (RAM), the non-volatile (NV) memory 408, the HF RFST 308, the UHF RFST 312, the UHF antenna 410 and the HF antenna 412. Additionally, the RFST module 450 of the illustrated example includes a low energy Bluetooth module 460, a low energy Bluetooth antenna 462, which is in communication with a Bluetooth radio (e.g., a Bluetooth device, a Bluetooth enabled cell phone, a Bluetooth enabled tablet, etc.) 464.

In this example, the Bluetooth radio 464, which may be in communication with other devices and/or sensors, may transmit or receive signals from the Bluetooth module 460 via the Bluetooth antenna 462. In some examples, the Bluetooth radio 464 can read and/or write to the non-volatile memory 408 when the Bluetooth radio 464 is in communication with the RFST module 450. Additionally or alternatively, the Bluetooth radio 464 may interface with the microcontroller 302, the UHF RFST 312 and/or the HF RFST 308. In some examples, parameters (e.g., pairing parameters, authentication parameters, etc.) of the Bluetooth device 464 may be provided to the non-volatile memory 408 and/or the microcontroller 302 from the UHF reader/writer 416 and/or the HF reader/writer 415. In some examples, the Bluetooth radio 464 relays sensor alarms and/or thresholds to the microcontroller 302, the positioner microcontroller 452 and/or the DCS 401 via the signal wires 418. In some examples, the Bluetooth module 460 is used in combination with one other communication interface (e.g., the Bluetooth module 460 and the HF RFST 308, the Bluetooth module 460 and the UHF RFST 312, etc.). Additionally or alternatively, an interact protocol (IP) module may be used for communications and/or firmware.

While an example manner of implementing the RFST 124 of FIG. 1 is illustrated in FIGS. 1-4B, one or more of the elements, processes and/or devices illustrated in FIGS. 1-4B, may be combined, divided, re-arranged, omitted, eliminated and/or implemented in any other way. Further, the microcontroller 302, the example memory 304, the example energy harvesting component 306, the energy harvesting component 307, the example HF RFST 308, the example memory 310, the example UHF RFST 312, the example memory 314, the example energy storage 322, the example system power management circuitry 324, the loop power source 326, the example HART modem 402, the example non-volatile memory 408, the UHF antenna 410, the HF antenna 412, the power management circuitry 414, the HF RFID reader/writer 415, the UHF RFID reader/writer 416, the positioner microcontroller 452, the low power Bluetooth module 460, the low power Bluetooth antenna 462, the Bluetooth radio 464 and/or, more generally, the example RFSTs 124, 200, 400, 450 may be implemented by hardware, software, firmware and/or any combination of hardware, software and/or firmware. Thus, for example, any of the example the microcontroller 302, the example memory 304, the example energy harvesting component 306, the energy harvesting component 307, the example HF RFST 308, the example memory 310, the example UHF RFST 312, the example memory 314, the example energy storage 322, the example system power management circuitry 324, the loop power source 326, the example HART modem 402, the example non-volatile memory 408, the UHF antenna 410, the HF antenna 412, the power management circuitry 414, the HF RFID reader/writer 415, the UHF RFID reader/writer 416, the positioner microcontroller 452, the low power Bluetooth module 460, the low power Bluetooth antenna 462, the Bluetooth radio 464 and/or, more generally, the example RFSTs 124, 200, 400, 450 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the microcontroller 302, the example memory 304, the example energy harvesting component 306, the energy harvesting component 307, the example HF RFST 308, the example memory 310, the example UHF RFST 312, the example memory 314, the example energy storage 322, the example system power management circuitry 324, the loop power source 326, the example HART modem 402, the example non-volatile memory 408, the UHF antenna 410, the HF antenna 412, the power management circuitry 414, the HF RFID reader/writer 415, the UHF RFID reader/writer 416, the positioner microcontroller 452, the low power Bluetooth module 460, the low power Bluetooth antenna 462, the Bluetooth radio 464 and/or, more generally, the example RFSTs 124, 200, 400, 450 is/are hereby expressly defined to include a tangible computer readable storage device or storage disk such as a memory, a digital versatile disk (DVD), a compact disk (CD), a Blu-ray disk, etc. storing the software and/or firmware. Further still, the example RFST 124 of FIG. 1 may include one or more elements, processes and/or devices in addition to, or instead of, those illustrated in FIGS. 2A, 2B, 3, 4A, 4B and/or may include more than one of any or all of the illustrated elements, processes and devices.

Figure 5:
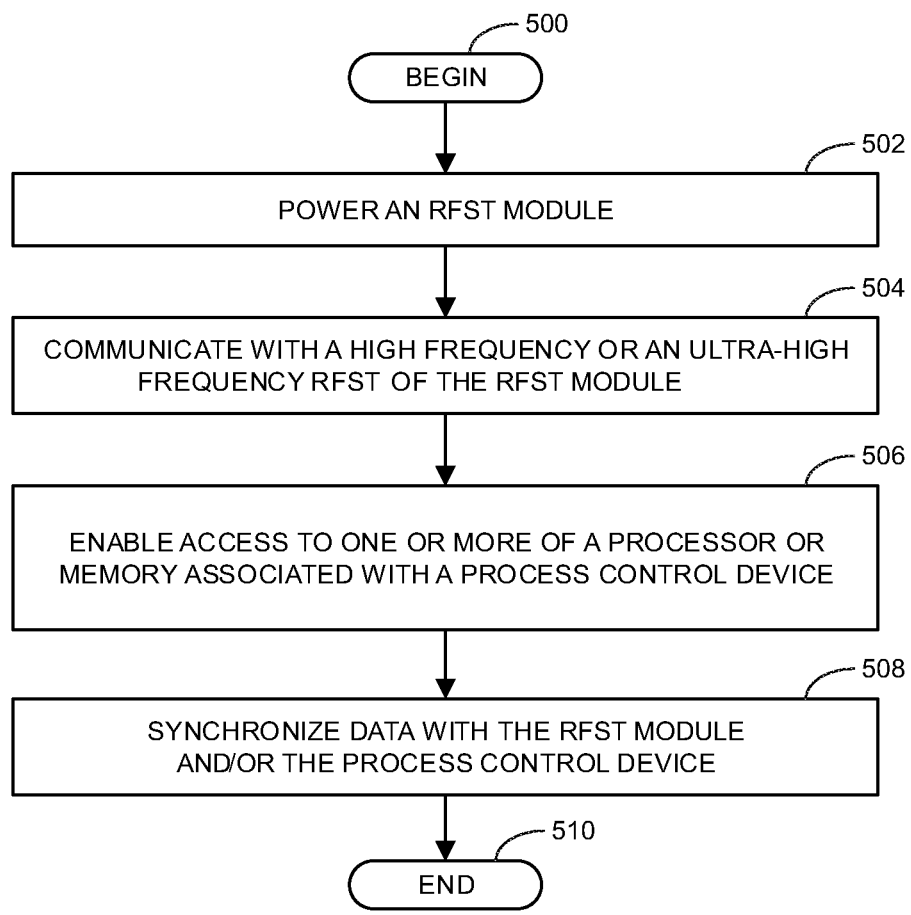
FIG. 5 is a flowchart representative of an example method for implementing the example RFST modules of FIGS. 2A, 4A and 4B for wireless data communications between a field device and a local RFID reader/writer.
Figure 6:
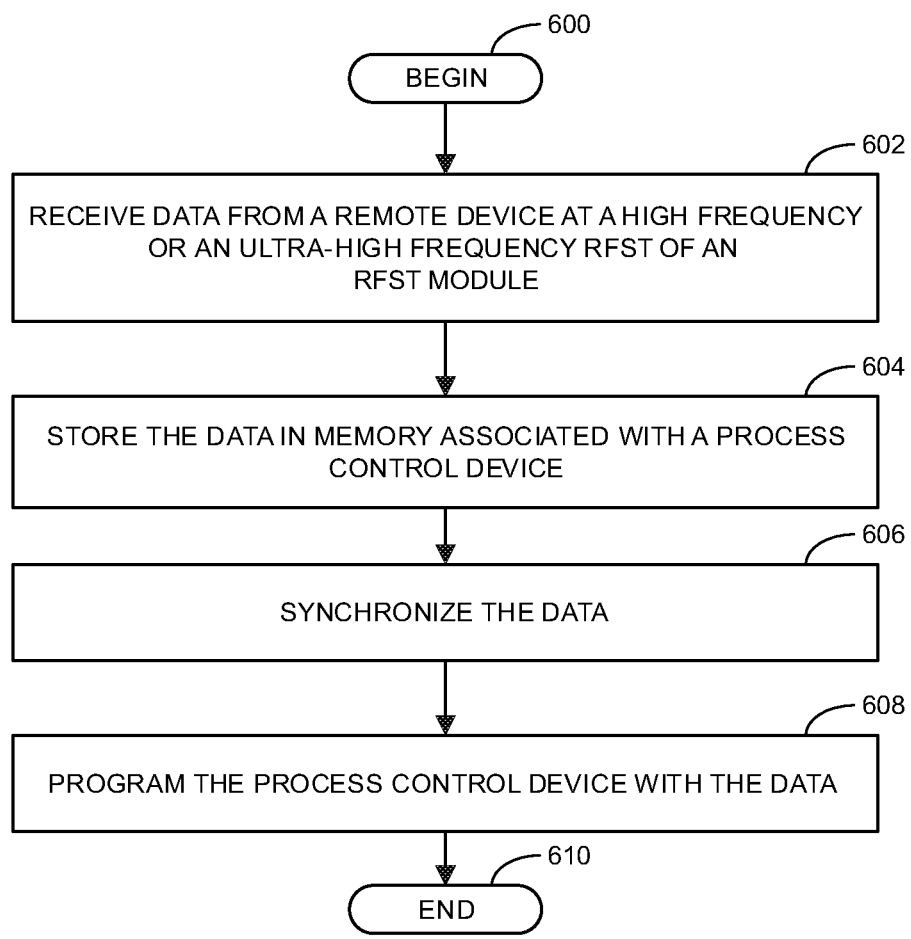
FIG. 6 is a flowchart representative of an example method to wirelessly program a field device by implementing a remote RFID reader/writer to communicate with the example RFST modules of FIGS. 2A, 4A and 4B.

A flowchart representative of example methods for implementing the RFST 124 of FIG. 1 is shown in FIGS. 5-6. In these examples, the methods may be implemented as machine readable instructions that comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 5-6, many other methods of implementing the example RFST 124 may alternatively be used. For example, the order of execution of the blocks may be changed, and/or some of the blocks described may be changed, eliminated, or combined.

As mentioned above, the example methods of FIGS. 5-6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 5-6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 5 is a flowchart representative of an example method for implementing the example RFSTs 200 of FIG. 2, 400 of FIG. 4A and 450 of FIG. 4B for wireless data communications between a field device and a local RFID reader/writer. The method of FIG. 5 begins at block 500 where a portable RFID reader/writer (e.g., the UHF reader/writer 416, the HF reader/writer 415) is used to communicate with a process control device. The RFID reader/writer of the illustrated example emits a electromagnetic field. In this example, a RFST module, which includes both HF and UHF RFSTs such as the RFST module 400 described above in connection with FIG. 4, has an energy harvester (e.g., the energy harvester 306, the energy harvester 307) that draws power from the electromagnetic field emitted by the RFID reader/writer (block 502). Additionally or alternatively, the RFST may be powered by loop power scavenged from the process control device and/or a DCS. In this particular example, the UHF RFST is powered by loop power for increased range while the HF RFST is powered, via an energy harvester, by an electromagnetic field emitted by the RFID reader/writer. In this example, the UHF RFST may optionally be powered by energy harvesting.

In some examples, the RFST is only powered by a electromagnetic field (e.g., passive), whereby both the HF RFST and the UHF RFST rely on power harvested from the electromagnetic field. In other examples, UHF RFST of the RFST is only powered by the loop power to increase the range of the RFST. In yet other examples, the UHF or HF RFST of the RFST may be powered by a battery or a capacitor.

Communication is then established between the RFID reader/writer and the high frequency RFST or the ultra-high frequency RFST via an antenna (block 504). In particular, the RFID reader/writer of the illustrated example establishes a communication link to the HF RFST after the RFID reader/writer has been authorized, for example, to allow transmitting to and/or receiving data from the antenna of the RFST.

After communication is established, the RFID reader/writer is enabled access to one or more of a processor or memory associated with the process control device (block 506). In this example, once the RF communication link is established via either the HF RFST or the UHF RFST, the RFID reader/writer communicates with and/or commands a microcontroller (e.g., a microprocessor) of the RFST. For example, this communication may involve retrieving a serial number from non-volatile memory of the RFST (e.g., the non-volatile memory 408). Alternatively, the communication may involve writing data to the non-volatile memory. In some examples, the HF and UHF RFSTs communicate directly with a processor and/or memory of the corresponding process control device to program, configure and/or command the process control device, for example. Such a direct interface may be used to upgrade firmware of the process device, issue commands to the process device and/or retrieve data from the process device.

Alternatively, in some examples, the RFID reader/writer accesses the on-board memory of the HF or UHF RFSTs to retrieve and/or write data to the on-board memory of these interfaces. In particular, the RFID reader/writer may bypass accessing the processor or the non-volatile memory of the RFST to write or retrieve data from on-board memory of the HF or UHF RFSTs.

In some examples, data is synchronized and/or transmitted within or between on-board memory of the HF or UHF RFSTs, the non-volatile memory on the RFST, the microcontroller of the RFST, memory of the process device and/or a processor of the process device (block 508) and the process ends (block 510). In particular, data may be shifted and/or copied between these components when a condition has changed (e.g., when loop power is later turned on, etc.). For example, data may be stored in the on-board memory of the HF or UHF RFSTs and/or non-volatile memory of the RFST when loop power is off and then later transferred to RAM, different memory, and/or the process control device once the loop power has been restored.

FIG. 6 is a flowchart representative of an example method to wirelessly program a field device (e.g., a process control device) by implementing a handheld remote RFID reader/writer that can communicate with the example RFSTs 200, 400 and 450 of FIGS. 2A, 4A and 4B, respectively. In this example, a handheld RFID reader/writer (e.g., the reader/writers 415, 416) is being used to program the field device in the absence of loop power provided to the field device and a RFST. The process begins at block 600 where the RFID reader/writer is initialized to program the field device (block 600). In some examples, this initialization occurs when the RFID reader/writer accesses or reads a serial number, firmware version and/or device designation (part number, SKU etc.) of the field device from the RFST. In this example, the RFST then receives data from the RFID reader/writer via an HF RFST (e.g., the HF RFST 308) (block 602). While the HF RFST is used in this example, alternatively, the UHF RFST may also be used in a semi-passive or passive mode via an electromagnetic field provided by the RFID reader/writer and/or utilize energy stored in a battery or a capacitor resulting from loop power and/or harvested energy from the electromagnetic field. Additionally or alternatively, an LF RFST and/or an SHF RFST may be used in the illustrated example.

Next, in this example the RFID reader/writer stores data in memory associated with the process control device via communication with a HF RFST such as non-volatile memory (e.g., the non-volatile memory 408) of the RFST (block 604). The rate at which the data is stored may depend on the on-board memory capabilities of the HF RFST mentioned above (e.g., throughput from on-board memory of the HF RFST to the non-volatile memory in energy harvesting conditions). Alternatively, the RFID reader/writer may power a microcontroller of the RFST to interface and program the field device directly through energy harvesting.

In this example, the data is firmware for the field device. However, the data may be a command and/or operating parameters for the field device. The memory may be located on the RFST, within the HF RFST (e.g., on-board memory), within the UHF RFST or within the field device.

The data is then synchronized between one or more components of the RFST and/or the field device (606). In this example, synchronization occurs between non-volatile memory on the RFST and non-volatile memory of the field device. In particular, once loop power has been restored to the interface and/or the RFST has been prompted for data synchronization, the data is then transferred from non-volatile memory of the RFST to the memory of the field device, for example. The prompt may occur through timing (e.g., default timing corresponding to certain events such as time after power has been turned on) of the RFST and/or certain operational conditions being met (e.g., the field device has been instructed to accept the new firmware via a central network and/or the RFID reader/writer, etc.).

Once, the field device has the data stored either in RAM or non-volatile memory of the field device, for example, the field device is programmed (block 608) and the process ends (block 610). Alternatively, the data may comprise a command that is executed upon being transferred to the field device to be later executed, for example.

Figure 7:
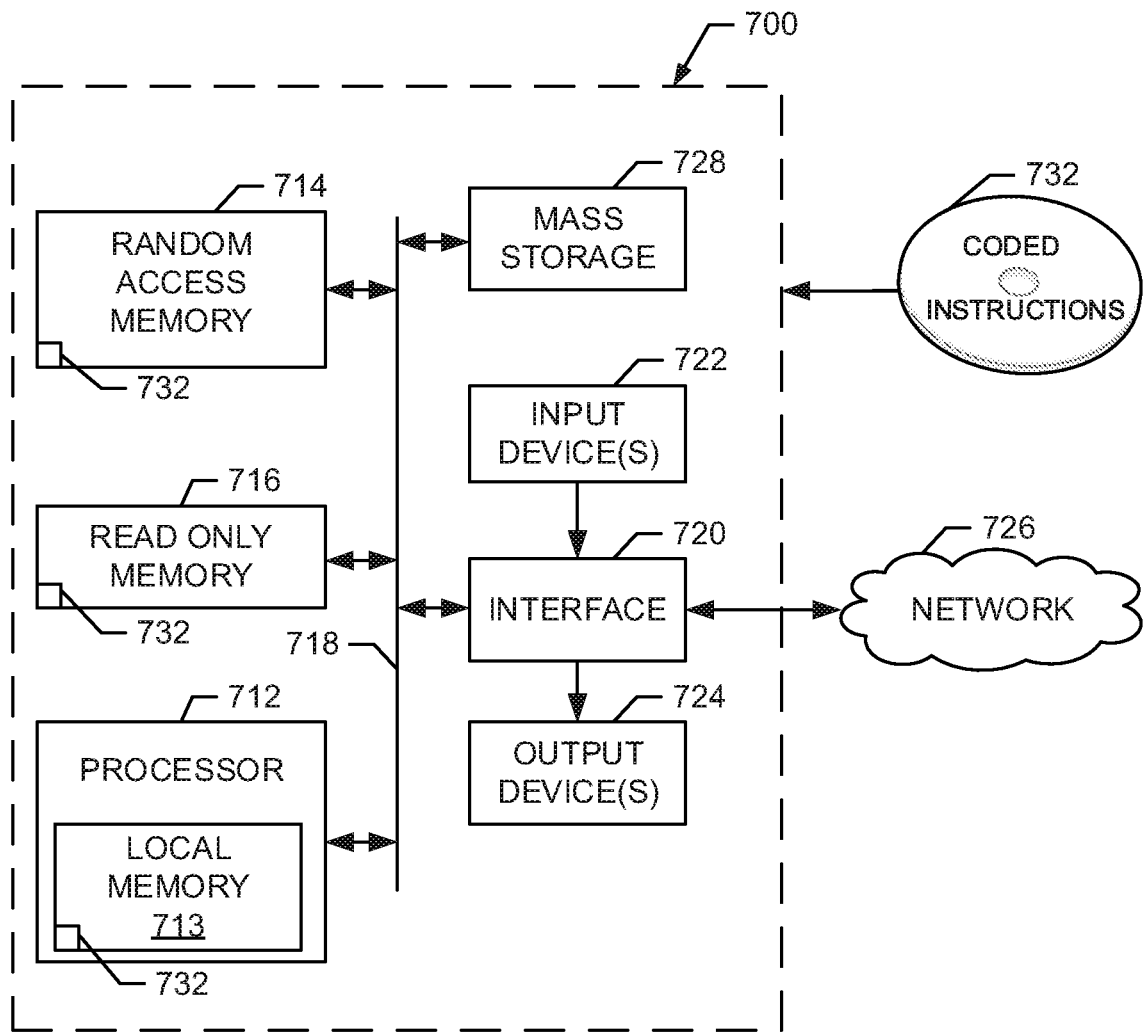
FIG. 7 is a block diagram of an example processor platform capable of executing instructions to implement the methods of FIGS. 5-6 and the RFST module 124 of FIG. 1.

FIG. 7 is a block diagram of an example processor platform 700 capable of executing instructions to implement the methods of FIGS. 5-6 and the RFST 124 of FIG. 1. The processor platform 700 can be, for example, a server, a personal computer, a mobile device (e.g., a cell phone, a smart phone, a tablet such as an iPad™), a personal digital assistant (PDA), an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (DLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

Coded instructions 732 to implement the methods of FIGS. 5 and 6 may be stored in the mass storage device 728, in the volatile memory 714, in the non-volatile memory 716, and/or on a removable tangible computer readable storage medium such as a CD or DVD.

From the foregoing, it will be appreciated that the above disclosed methods, apparatus and articles of manufacture allow numerous functions and/or operations to occur even when a process control device is unpowered during a plant shutdown, for example. The examples disclosed herein allow numerous interface options to a process control device that bypass slow and cumbersome networks. The examples disclosed herein enable convenient and quick access to data pertaining to process control devices in a variety of scenarios including plant shutdowns. The examples disclosed herein also allow significant power savings and higher data rates for communication with a process control device.

This patent includes subject matter related to U.S. application Ser. No. 14/297,179, which was filed on Jun. 5, 2014, and which claims priority to U.S. Provisional Application Ser. No. 61/832,524 filed on Jun. 7, 2013; U.S. Provisional Application Ser. No. 61/951,187 filed on Mar. 11, 2014; and U.S. Provisional Application Ser. No. 61/977,398 filed on Apr. 9, 2014, all of which are hereby incorporated by reference in their entireties.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While the examples disclosed herein relate to process control systems and/or process control devices, the examples disclosed herein may be applied to other systems including retail, stocking, inventory, etc.

What is claimed is:

1. A method comprising:
receiving operational data from a process control field device via a modem coupled to a microcontroller, the operational data corresponding to an instruction or operation of the process control field device;
storing, via a data bus, the operational data in at least one of a first radio frequency sensor tag (RFST) coupled to the process control field device via the microcontroller or a second RF ST coupled to the process control field device via the microcontroller, the first RFST communicating via a first frequency band and having a first memory, the second RFST communicating via a second frequency band different than the first frequency band and having a second memory;
retrieving, via the first RFST, the operational data from the modem via the microcontroller and storing the operational data in the first memory;
retrieving, via the second RFST, the operational data from the modem via the microcontroller and storing the operational data in the second memory;
controlling power, via a power manager, to a third memory when loop power is not provided to allow the third memory to cache the operational data to the first memory and the second memory, the power manager coupled to the third memory, the first RF ST and the second RFST; and
retrieving, via a handheld device, the operational data from at least one of the first RFST or the second RFST while the process control field device is unpowered.

2. The method as defined in claim 1, wherein communicating via the first RF ST includes communicating via an ultra-high frequency (UHF) band and communicating via the second RFST includes communicating via a high-frequency (HF) band.

3. The method as defined in claim 1, wherein storing the operational data includes storing the operational data via the microcontroller.

4. The method as defined in claim 1, wherein the data bus is a serial peripheral interface bus.

5. The method as defined in claim 1, wherein the handheld device is a radio frequency identification device (RFID) reader/writer.

6. The method as defined in claim 1 further including communicating, via wireless communications, via the handheld device with at least one of the first RFST or the second RFST, the first RFST electrically coupled to a first antenna and the second RFST electrically coupled to a second antenna.

7. The method as defined in claim 6, wherein the first antenna is a UHF antenna and the second antenna is an HF antenna.

8. The method as defined in claim 1 further including powering the first RF ST and the second RF ST via an energy harvester when loop power is not provided to the process control field device.

9. The method as defined in claim 1 further including utilizing a magnetic field from the handheld device to enable energy harvesters to power the first RFST and the second RFST while loop power is not provided.

10. The method as defined in claim 1, wherein the first RFST and the second RF ST determine when loop power is not provided to the process control field device via the power manager.

11. An apparatus comprising:
a modem coupled to a microcontroller to receive operational data from a process control field device, the operational data corresponding to an instruction or operation of the process control field device;
a first sensor tag coupled to the microcontroller and including a first memory, and a second sensor tag coupled to the microcontroller and including a second memory, the first sensor tag and the second sensor tag to retrieve operational data from the modem via the microcontroller and store the operational data in the respective first memory and second memory;
a power manager coupled to a third memory, the first sensor tag, and the second sensor tag, the power manager to control power provided to the third memory when loop power is not provided to allow the third memory to cache operational data to the first memory and the second memory; and
a first antenna coupled to the first sensor tag and a second antenna coupled to the second sensor tag, the first antenna and the second antenna to provide operational data from the first memory and second memory to a handheld device when loop power is not provided.

12. The apparatus of claim 11, further including a data bus coupled to the microcontroller, the third memory, the first sensor tag, and the second sensor tag to provide communication of the operational data of the process control field device between the microcontroller, the third memory, the first sensor tag, and the second sensor tag when loop power is not provided.

13. The apparatus of claim 12, wherein the data bus is a serial peripheral interface (SPI) bus or an inter integrated circuit (I$^2$C) bus.

14. The apparatus of claim 11, wherein the first sensor tag is an ultra-high frequency radio frequency sensor tag (UHF RF ST) communicating via a first frequency band and the second sensor tag is a high frequency (HF) RF ST communication via a second frequency band.

15. The apparatus of claim 14, wherein the first antenna is a UHF antenna communicating via the first frequency band and the second antenna is an HF antenna communicating via the second frequency band.

16. The apparatus of claim 11, wherein the modem receives operational data from the process control field device via a highway addressable remote transducer (HART) protocol.

17. The apparatus of claim 11, wherein the first sensor tag and the second sensor tag utilize energy harvesting to provide operational data to the handheld device when loop power is not provided.

18. The method of claim 1, wherein, when loop power is not provided, providing operational data from the first memory to the handheld device via a first antenna coupled to the first RF ST or providing operational data from the second memory to the handheld device via a second antenna coupled to the second RFST.

19. A non-transitory computer readable medium including instructions, which when executed, cause a processor to:
receive, via a modem coupled to a microcontroller, operational data from a process control field device, the operational data corresponding to an instruction or operation of the process control field device;
store the operational data in a first memory of a first sensor tag coupled to the microcontroller and a second memory of a second sensor tag coupled to the microcontroller;
control power, via a power manager coupled to a third memory, the first sensor tag, and the second sensor tag, to the third memory when loop power is not provided to allow the third memory to cache the operational data to the first memory and the second memory; and
communicate the operational data from the first memory and second memory to a handheld device when loop power is not provided via a first antenna coupled to the first sensor tag and a second antenna coupled to the second sensor tag.

20. The non-transitory computer readable medium of claim 19, wherein the processor is to provide communication of the operational data of the process control field device between the microcontroller, the third memory, the first sensor tag, and the second sensor tag via a data bus that is coupled to the microcontroller, the third memory, the first sensor tag, and the second sensor tag when loop power is not provided.

21. The non-transitory computer readable medium of claim 20, wherein the data bus is a serial peripheral interface (SPI) bus or an inter integrated circuit (I$^2$C) bus.

22. The non-transitory computer readable medium of claim 19, wherein the first sensor tag is an ultra-high frequency radio frequency sensor tag communicating via a first frequency band and the second sensor tag is a high frequency communicating via a second frequency band.

23. The non-transitory computer readable medium of claim 19, wherein the modem receives the operational data from the process control field device via a highway addressable remote transducer (HART) protocol.

24. The non-transitory computer readable medium of claim 19, wherein the processor is to power the first memory of the first sensor tag via an energy harvester when loop power is not provided to the process control field device.

25. The non-transitory computer readable medium of claim 19, wherein the processor determines when loop power is not provided to the process control field device to enable the first sensor tag to utilize energy harvesting.

26. The non-transitory computer readable medium of claim 19, wherein the processor is to communicate, via wireless communications, with the handheld device via at least one of the first sensor tag or the second sensor tag, the first sensor tag electrically coupled to a first antenna and the second sensor tag electrically coupled to a second antenna.

27. The non-transitory computer readable medium of claim 19, further including a handheld device to retrieve the operational data from at least one of the first sensor tag or the second sensor tag while the process control field device is unpowered.

* * * * *